(12) United States Patent  
Yoshioka et al.

(10) Patent No.: US 12,167,279 B2  
(45) Date of Patent: Dec. 10, 2024

(54) TERMINAL AND COMMUNICATION METHOD

(71) Applicant: NTT DOCOMO, INC., Tokyo (JP)

(72) Inventors: Shohei Yoshioka, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 17/916,718

(22) PCT Filed: Mar. 26, 2021

(86) PCT No.: PCT/JP2021/013110  
§ 371 (c)(1),  
(2) Date: Oct. 3, 2022

(87) PCT Pub. No.: WO2021/215195  
PCT Pub. Date: Oct. 28, 2021

(65) Prior Publication Data  
US 2023/0345305 A1    Oct. 26, 2023

(30) Foreign Application Priority Data

Apr. 22, 2020    (JP) ................................ 2020-076211

(51) Int. Cl.  
*H04W 28/18*    (2009.01)  
*H04L 1/00*    (2006.01)  
(Continued)

(52) U.S. Cl.  
CPC .......... *H04W 28/18* (2013.01); *H04L 1/0003* (2013.01); *H04L 1/0009* (2013.01); *H04L 27/3488* (2013.01); *H04W 92/18* (2013.01)

(58) Field of Classification Search  
None  
See application file for complete search history.

(56) References Cited

U.S. PATENT DOCUMENTS 10,798,688 B2 * 10/2020 Baldemair ............ H04L 1/0057  
10,834,748 B2 * 11/2020 Nammi ................. H04L 1/0031  
(Continued)

FOREIGN PATENT DOCUMENTS

BR    112021015760 A2 * 10/2021 ........... H04L 5/0044  
CA       3152932 A1 *  8/2021 ........... H04L 5/0053  
(Continued)

OTHER PUBLICATIONS

International Search Report issued in PCT/JP2021/013110 mailed on Jun. 22, 2021 (7 pages).  
(Continued)

*Primary Examiner* — Berhanu Tadese  
(74) *Attorney, Agent, or Firm* — Osha Bergman Watanabe & Burton LLP

(57) ABSTRACT

A terminal includes: a reception unit configured to receive information related to MCS (Modulation and coding scheme) applied to a terminal-to-terminal direct communication; a control unit configured to determine, in a case where a plurality of MCS tables are configured by the information, which MCS table is to be used, and to determine an MCS from the determined MCS table; and a communication unit configured to perform the terminal-to-terminal direct communication using the determined MCS, wherein the control unit determines an upper limit and a lower limit of available MCSs in the determined MCS table, based on a parameter included in the information.

6 Claims, 14 Drawing Sheets

(51) Int. Cl.
  *H04L 27/34* (2006.01)
  *H04W 92/18* (2009.01)

(56) References Cited

U.S. PATENT DOCUMENTS

| | | | | |
|---|---|---|---|---|
| 10,856,308 B2* | 12/2020 | Lin | | H04L 1/0035 |
| 10,893,547 B2* | 1/2021 | Lei | | H04L 5/0094 |
| 11,115,098 B2* | 9/2021 | Islam | | H04L 1/0003 |
| 11,395,269 B2* | 7/2022 | Baldemair | | H04W 72/0446 |
| 11,412,480 B2* | 8/2022 | Yasukawa | | H04W 24/10 |
| 11,451,333 B2* | 9/2022 | Andersson | | H04L 1/0004 |
| 11,497,035 B2* | 11/2022 | Lin | | H04L 1/0003 |
| 11,528,108 B2* | 12/2022 | Lee | | H04W 72/0446 |
| 11,689,335 B2* | 6/2023 | Zhang | | H04L 5/0053 370/329 |
| 11,690,078 B2* | 6/2023 | Yasukawa | | H04W 28/06 370/329 |
| 11,723,027 B2* | 8/2023 | Lee | | H04W 72/1273 370/329 |
| 2018/0116007 A1* | 4/2018 | Yasukawa | | H04W 72/1263 |
| 2018/0167989 A1* | 6/2018 | Yasukawa | | H04W 92/18 |
| 2018/0324010 A1* | 11/2018 | Gulati | | H04L 1/0011 |
| 2019/0108670 A1* | 4/2019 | Iizuka | | G06T 15/005 |
| 2019/0313426 A1* | 10/2019 | Lin | | H04W 72/12 |
| 2020/0322923 A1* | 10/2020 | Yasukawa | | H04W 72/02 |
| 2021/0243773 A1* | 8/2021 | Osawa | | H04L 5/0053 |
| 2021/0288778 A1* | 9/2021 | Park | | H04L 1/1858 |
| 2021/0321384 A1* | 10/2021 | Osawa | | H04W 72/20 |
| 2022/0014610 A1* | 1/2022 | Yi | | H04L 69/04 |
| 2022/0022094 A1* | 1/2022 | Lee | | H04L 1/1812 |
| 2022/0022233 A1* | 1/2022 | Lee | | H04L 1/0025 |
| 2022/0039073 A1* | 2/2022 | Lee | | H04W 72/23 |
| 2022/0069957 A1* | 3/2022 | Lee | | H04W 72/23 |
| 2022/0078826 A1* | 3/2022 | Lee | | H04L 5/0051 |
| 2022/0095350 A1* | 3/2022 | Lee | | H04L 1/0061 |
| 2022/0095367 A1* | 3/2022 | Kim | | H04W 74/0833 |
| 2022/0110069 A1* | 4/2022 | Wang | | H04W 52/383 |
| 2022/0124707 A1* | 4/2022 | Bae | | H04W 72/0446 |
| 2022/0131652 A1* | 4/2022 | Bae | | H04L 5/1469 |
| 2022/0132495 A1* | 4/2022 | Bae | | H04W 72/02 |
| 2022/0141857 A1* | 5/2022 | Lee | | H04W 72/23 370/329 |
| 2022/0166484 A1* | 5/2022 | Go | | H04W 72/046 |
| 2022/0173828 A1* | 6/2022 | Yoshioka | | H04L 1/0003 |
| 2022/0173829 A1* | 6/2022 | Huang | | H04L 5/0082 |
| 2022/0190983 A1* | 6/2022 | Zhao | | H04W 16/00 |
| 2022/0210695 A1* | 6/2022 | Andersson | | H04W 28/065 |
| 2022/0248438 A1* | 8/2022 | Lee | | H04L 5/0053 |
| 2022/0376816 A1* | 11/2022 | Yoshioka | | H04L 1/0016 |
| 2023/0007534 A1* | 1/2023 | Wu | | H04L 5/0044 |
| 2023/0080567 A1* | 3/2023 | Lin | | H04L 1/1819 370/329 |
| 2023/0087401 A1* | 3/2023 | Shin | | H04W 4/46 370/329 |
| 2023/0091763 A1* | 3/2023 | Mohammad Soleymani | | H04W 72/02 370/329 |
| 2023/0345305 A1* | 10/2023 | Yoshioka | | H04L 1/0009 |

FOREIGN PATENT DOCUMENTS

| | | | | |
|---|---|---|---|---|
| CN | 110786041 A | * | 2/2020 | H04W 24/10 |
| CN | 110800327 A | * | 2/2020 | H04B 1/713 |
| CN | 111385862 A | * | 7/2020 | H04W 52/146 |
| CN | 112291851 A | * | 1/2021 | H04L 5/0055 |
| CN | 112398575 A | * | 2/2021 | H04L 1/0004 |
| CN | 112534903 A | * | 3/2021 | H04L 5/0048 |
| CN | 111385862 B | * | 8/2021 | H04W 52/146 |
| CN | 113259052 A | * | 8/2021 | |
| CN | 113453353 A | * | 9/2021 | H04L 5/0044 |
| CN | 113632535 A | * | 11/2021 | H04L 1/0003 |
| CN | 113728714 A | * | 11/2021 | H04L 5/0044 |
| CN | 112398575 B | * | 4/2022 | H04L 1/0004 |
| CN | 114600553 A | * | 6/2022 | H04L 1/0003 |
| CN | 113453353 B | * | 9/2022 | H04L 5/0044 |
| CN | 115002733 A | * | 9/2022 | H04L 5/0048 |
| CN | 115443680 A | * | 12/2022 | H04L 1/0003 |
| CN | 114600553 B | * | 12/2023 | H04L 1/0003 |
| CN | 117242857 A | * | 12/2023 | H04L 5/0048 |
| CN | 117256186 A | * | 12/2023 | H04L 5/001 |
| EP | 3337068 A1 | * | 6/2018 | H04J 11/00 |
| EP | 3836500 A1 | | 8/2018 | |
| EP | 3563503 B1 | * | 3/2021 | H04L 1/00 |
| EP | 3836667 A1 | * | 6/2021 | H04L 5/0048 |
| EP | 3855855 A1 | * | 7/2021 | H04L 5/0048 |
| EP | 3695536 B1 | * | 12/2021 | H04L 1/0003 |
| EP | 3952436 A1 | * | 2/2022 | H04L 1/0003 |
| EP | 3836667 A4 | * | 3/2022 | H04L 5/0048 |
| EP | 4054287 A1 | * | 9/2022 | H04L 1/0003 |
| EP | 3815280 B1 | * | 11/2022 | H04L 5/0053 |
| EP | 4142431 A1 | * | 3/2023 | H04L 1/0003 |
| EP | 3665795 B1 | * | 10/2023 | H04L 1/0057 |
| EP | 4280526 A2 | * | 11/2023 | H04L 1/0057 |
| EP | 4287751 A2 | * | 12/2023 | H04L 5/0044 |
| EP | 4300902 A2 | * | 1/2024 | H04L 1/0003 |
| EP | 4304220 A1 | * | 1/2024 | H04L 5/0048 |
| EP | 4304241 A1 | * | 1/2024 | H04L 5/001 |
| ES | 2936161 T3 | * | 3/2023 | H04L 5/0053 |
| JP | 7025564 B2 | * | 2/2022 | H04L 1/0003 |
| JP | 2022068376 A | * | 5/2022 | H04L 5/003 |
| TW | 202034732 A | * | 9/2020 | H04L 5/0044 |
| WO | WO-2016163509 A1 | * | 10/2016 | H04W 28/06 |
| WO | WO-2017026477 A1 | * | 2/2017 | H04J 11/00 |
| WO | WO-2017169835 A1 | * | 10/2017 | H04W 4/04 |
| WO | 2020/031357 A1 | | 8/2018 | |
| WO | WO-2019031998 A1 | * | 2/2019 | H04L 1/0057 |
| WO | WO-2019069147 A1 | * | 4/2019 | H04L 1/00 |
| WO | WO-2019193411 A1 | * | 10/2019 | H04L 1/0003 |
| WO | WO-2020005128 A1 | * | 1/2020 | H04L 5/0053 |
| WO | WO-2020031384 A1 | * | 2/2020 | H04L 5/0048 |
| WO | WO-2020154169 A1 | * | 7/2020 | H04L 5/0044 |
| WO | WO-2020165835 A1 | * | 8/2020 | H04L 5/0044 |
| WO | WO-2020202481 A1 | * | 10/2020 | H04L 1/0003 |
| WO | WO-2021084758 A1 | * | 5/2021 | H04L 1/0003 |
| WO | WO-2021215195 A1 | * | 10/2021 | H04L 1/0003 |
| WO | WO-2023012952 A1 | * | 2/2023 | |
| WO | WO-2023012953 A1 | * | 2/2023 | H04W 72/04 |
| WO | WO-2023012954 A1 | * | 2/2023 | |
| WO | WO-2023170826 A1 | * | 9/2023 | |
| WO | WO-2023170827 A1 | * | 9/2023 | |
| WO | WO-2023203684 A1 | * | 10/2023 | |
| WO | WO-2023203777 A1 | * | 10/2023 | |
| WO | WO-2023203778 A1 | * | 10/2023 | |

OTHER PUBLICATIONS

Written Opinion of the International Searching Authority issued in PCT/JP2021/013110 mailed on Jun. 22, 2021 (4 pages).
3GPP TS 38.211 V16.1.0; "3rd Generation Partnership Project; Technical Specification Group Radio Access Network; NR; Physical channels and modulation (Release 16)"; Mar. 2020 (130 pages).
3GPP TR 22.886 V15.1.0; "3rd Generation Partnership Project; Technical Specification Group Services and System Aspects; Study on enhancement of 3GPP Support for 5G V2X Services (Release 15)"; Mar. 2017 (58 pages).
3GPP TS 38.214 V16.1.0; "3rd Generation Partnership Project; Technical Specification Group Radio Access Network; NR; Physical layer procedures for data (Release 16)"; Mar. 2020 (151 pages).
Office Action issued in Japanese Patent Application No. 2022-516915, mailed on Mar. 12, 2024 (6 pages).
3GPP TS 38.331 V16.0.0; "3rd Generation Partnership Project; Technical Specification Group Radio Access Network; NR; Radio Resource Control (RRC) protocol specification (Release 16)"; Mar. 2020 (4 pages).
Extended European Search Report issued in counterpart European Patent Application No. 21792403.4, mailed on Apr. 25, 2024 (10 pages).
Office Action issued in Japanese Patent Application No. 2022-516915, mailed on Aug. 27, 2024 (3 pages).

(56) References Cited

OTHER PUBLICATIONS

Qualcomm Incorporated; "Considerations on Physical Layer aspects of NR V2X"; 3GPP TSG RAN WG1 Meeting #98bis, R1-1911104; Chongqing, China; Oct. 14-20, 2019 (3 pages).

* cited by examiner

FIG.14

```
sl-MCS-Table-r16       ENUMERATED {qam64, qam256, qam64LowSE}   OPTIONAL,   -- Need M sl-MinMCS-PSSCH-r16    INTEGER (0..27)                           OPTIONAL,   -- Need M
sl-MaxMCS-PSSCH-r16    INTEGER (0..31)                           OPTIONAL,   -- Need M
```

FIG.17 sl-MinMCS-PSSCH-r16    TABLE 1

| MCS Index $I_{MCS}$ | Modulation Order $Q_m$ | Target code Rate R x [1024] | Spectral efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| .. | .. | .. | .. | sl-MaxMCS-PSSCH-r16

A RANGE OF AVAILABLE MCS INDEX

TABLE 2

| MCS Index $I_{MCS}$ | Modulation Order $Q_m$ | Target code Rate R x [1024] | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 378 | 1.4766 |
| 6 | 4 | 434 | 1.6953 |
| 7 | 4 | 490 | 1.9141 |
| 8 | 4 | 553 | 2.1602 |
| 9 | 4 | 616 | 2.4063 |
| 10 | 4 | 658 | 2.5703 |
| 11 | 6 | 466 | 2.7305 |
| 12 | 6 | 517 | 3.0293 |
| 13 | 6 | 567 | 3.3223 |
| 14 | 6 | 616 | 3.6094 |
| 15 | 6 | 666 | 3.9023 |
| 16 | 6 | 719 | 4.2129 |
| 17 | 6 | 772 | 4.5234 |
| 18 | 6 | 822 | 4.8164 |
| .. | .. | .. | .. |

A RANGE OF AVAILABLE MCS INDEX

TERMINAL AND COMMUNICATION METHOD

TECHNICAL FIELD

The present invention relates to a terminal and a communication method in a wireless communication system.

BACKGROUND ART

In LTE (Long Term Evolution) and LTE successor systems (e.g., LTE-A (LTE Advanced), NR (New Radio) (also referred to as 5G)), a D2D (Device to Device) technology in which terminals communicate directly with each other without using base station is being discussed (e.g., Non-Patent Document 1).

The D2D reduces traffic between the terminals and the base stations and enables communication between the terminals even when the base stations are unable to communicate during a disaster, etc. Although the 3GPP (3rd Generation Partnership Project) refers to D2D as a "sidelink," the more generic term D2D is used herein. However, in the description of embodiments described below, the sidelink is also used as needed.

The D2D communication is broadly classified into D2D discovery for discovering other terminals capable of communication, and D2D communication (D2D direct communication, D2D communication, direct communication between terminals, etc.) for communicating directly between terminals. Hereinafter, when D2D communication and D2D discovery are not specifically distinguished, it is simply called D2D. A signal sent and received by D2D is called a D2D signal. Various use cases of V2X (Vehicle to Everything) services in NR have been discussed (e.g., Non-Patent Document 2).

In addition, in the terminal-to-terminal direct communication in NR, an MCS (Modulation and coding scheme) table for data transmission is supported (for example, Non-Patent Document 3).

CITATION LIST

Non-Patent Document

[Non-Patent Document 1] 3GPP TS 38.211 V16.1.0 (2020-03)
[Non-Patent Document 2] 3GPP TR 22.886 V15.1.0 (2017-03)
[Non-Patent Document 3] 3GPP TS 38.214 V16.1.0 (2020-02)

SUMMARY OF THE INVENTION

Technical Problem

In the terminal-to-terminal direct communication in NR, in a case where multiple MCS tables are supported, it was not clear how parameters specifying MCS are applied to the multiple MCS tables.

The present invention has been made in view of the above points, and it is an object of the present invention to appropriately configure a code rate in the terminal-to-terminal direct communication.

Solution to Problem

According to the disclosed technique, provided is a terminal including: a reception unit configured to receive information related to MCS (Modulation and coding scheme) applied to a terminal-to-terminal direct communication; a control unit configured to determine, in a case where a plurality of MCS tables are configured by the information, which MCS table is to be used, and to determine an MCS from the determined MCS table; and a communication unit configured to perform the terminal-to-terminal direct communication using the determined MCS, wherein the control unit determines an upper limit and a lower limit of available MCSs in the determined MCS table, based on a parameter included in the information.

Advantageous Effects of Invention

According to an embodiment of the present invention, it is possible to appropriately configure a code rate in the direct communication between terminals.

BRIEF DESCRIPTION OF THE DRAWINGS

FIG. 14 is a drawing illustrating an example of a parameter(s) related to MCS.
FIG. 17 is a drawing illustrating an example of applying parameters according to an embodiment of the present invention.

DETAILED DESCRIPTION OF THE PREFERRED EMBODIMENTS

Figure 1:
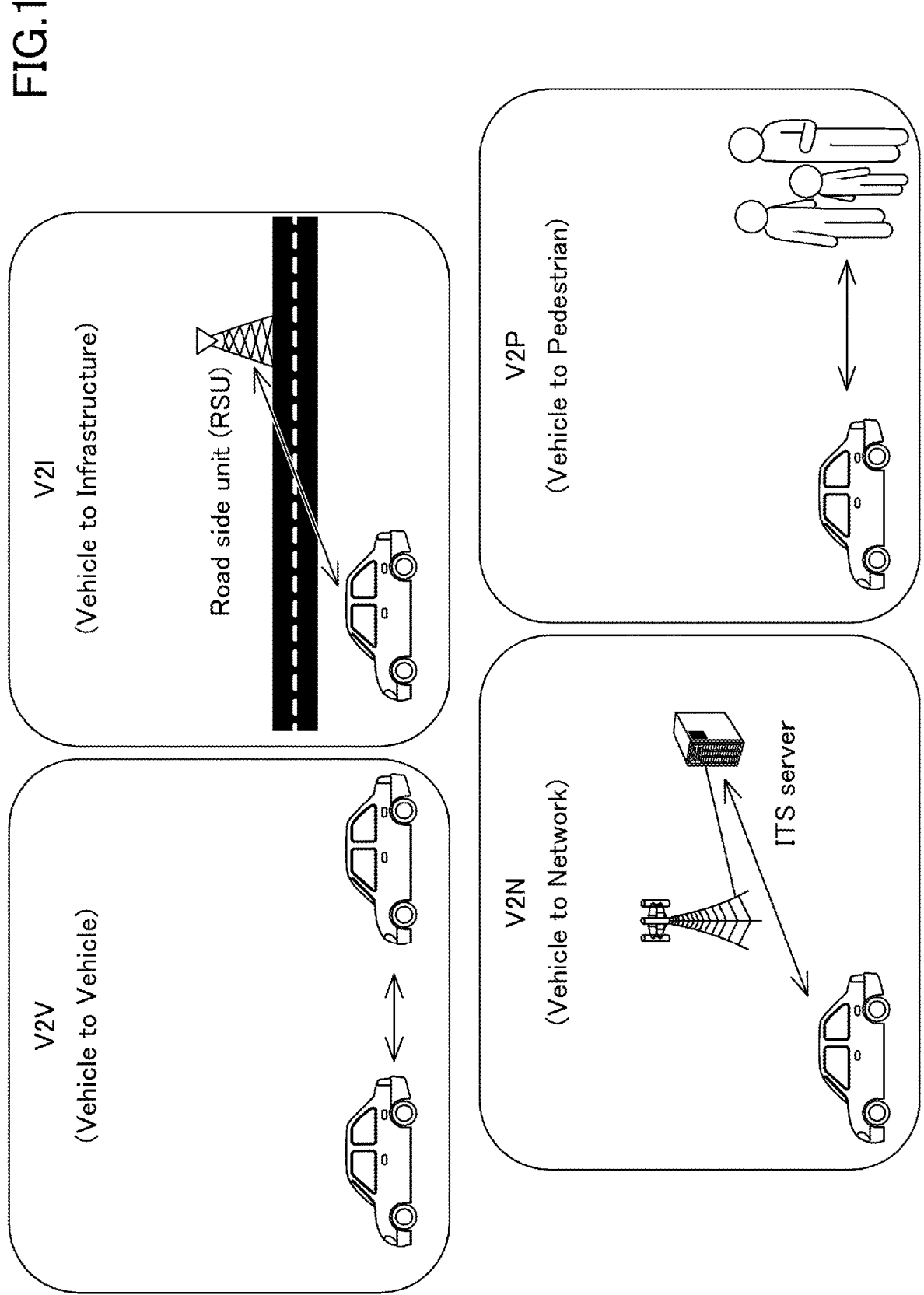
FIG. 1 is a drawing illustrating V2X.

In the following, referring to the drawings, one or more embodiments of the present invention will be described. It should be noted that the embodiments described below are examples. Embodiments of the present invention are not limited to the following embodiments.

In operations of a wireless communication system according to an embodiment of the present invention, conventional techniques will be used appropriately. With respect to the above, for example, the conventional techniques are related to, but not limited to, the existing LTE. Further, it is assumed that the term "LTE" used in the present specification has, unless otherwise specifically mentioned, a broad meaning including a scheme of LTE-Advanced and a scheme after LTE-Advanced (e.g., NR), or wireless LAN (Local Area Network).

Furthermore, in an embodiment of the present invention, the duplex method may be TDD (Time Division Duplex), FDD (Frequency Division Duplex), or other methods (e.g., Flexible Duplex, or the like).

Further, in an embodiment of the present invention, the expression, radio (wireless) parameters are "configured (set)" may mean that a predetermined value is pre-configured, may mean that a radio parameter indicated by the base station 10 or the terminal 20 is configured, or may mean that a radio parameter is defined in advance by technical specifications.

FIG. 1 is a drawing illustrating V2X. In 3GPP, enhancing D2D functions to realize V2X (Vehicle to Everything) or eV2X (enhanced V2x) has been discussed and specifications are being developed. As illustrated in FIG. 1, V2X is a part of ITS (Intelligent Transport Systems) and is a generic name (collective name) for: V2V (Vehicle to Vehicle) referring to a form of communication performed between vehicles; V2I (Vehicle to Infrastructure) referring to a form of communication performed between a vehicle and a road-side unit (RSU) that is installed on roadside; V2N (Vehicle to Network) referring to a form of communication performed between a vehicle and an ITS server; and V2P (Vehicle to Pedestrian) referring to a form of communication performed between a vehicle and a mobile terminal that is held by a pedestrian.

Further, in 3GPP, V2X using LTE/NR's cellular communication and communication between terminals has been discussed. V2X using cellular communication may be referred to as cellular V2X. In NR V2X, discussions have been performed to realize higher system capacity, reduced latency, higher reliability, QoS (Quality of Service) control.

With respect to LTE V2X or NR V2X, it is assumed that discussions may be not limited to 3GPP specifications in the future. For example, it is assumed to be discussed on: how to secure interoperability; how to reduce cost by implementing higher layers; how to use or how to switch multiple RATs (Radio Access Technologies); how to handle regulations of each country; how to obtain and distribute data of LTE/NR V2X platform; and how to manage and use databases.

In an embodiment of the present invention, a configuration of embodiment is mainly assumed in which communication apparatuses are mounted on vehicles. However, an embodiment of the present invention is not limited to such a configuration. For example, communication apparatuses may be terminals held by people, may be apparatuses mounted on drones or aircrafts, or may be base stations, RSUs, relay stations (relay nodes), terminal capable of scheduling, etc.

It should be noted that SL (Sidelink) may be distinguished from UL (Uplink) or DL (Downlink) based on any one of, or any combination of the following 1) through 4). Furthermore, SL may be referred to as a different name.

1) resource arrangement (allocation) in the time domain
2) resource arrangement (allocation) in the frequency domain
3) synchronization signal that should be referred to (including SLSS (Sidelink Synchronization Signal))
4) reference signal that is used for pass loss measurement used for transmission power control Further, with respect to OFDM (Orthogonal Frequency Division Multiplexing) of SL or UL, any of CP-OFDM (Cyclic-Prefix OFDM), DFT-S-OFDM (Discrete Fourier Transform-Spread-OFDM), OFDM without Transform precoding, and OFDM with Transform precoding may be applied.

In LTE SL, with respect to allocating SL resources to terminal 20, Mode 3 and Mode 4 are defined. In Mode 3, transmission resources are dynamically allocated using a DCI (Downlink Control Information) that is transmitted from a base station 10 to a terminal 20. Further, in Mode 3, SPS (Semi Persistent Scheduling) is enabled (available). In Mode 4, terminal 20 autonomously selects transmission resources from a resource pool.

It should be noted that a slot in an embodiment of the present invention may be read on (replaced with) a symbol, a mini slot, a subframe, a radio frame, or a TTI (Transmission Time Interval). Further, a cell in an embodiment of the present invention may be read on (replaced with) a cell group, a carrier component, a BWP (bandwidth part), a resource pool, a resource, a RAT (Radio Access Technology), a system (including a wireless LAN), etc.

Note that, in an embodiment of the present invention, the terminal 20 is not limited to a V2X terminal, but may be any type of terminal that performs D2D communication. For example, the terminal 20 may be a terminal carried by a user, such as a smart phone, or an IoT (Internet of Things) device, such as a smart meter.

Figure 2:
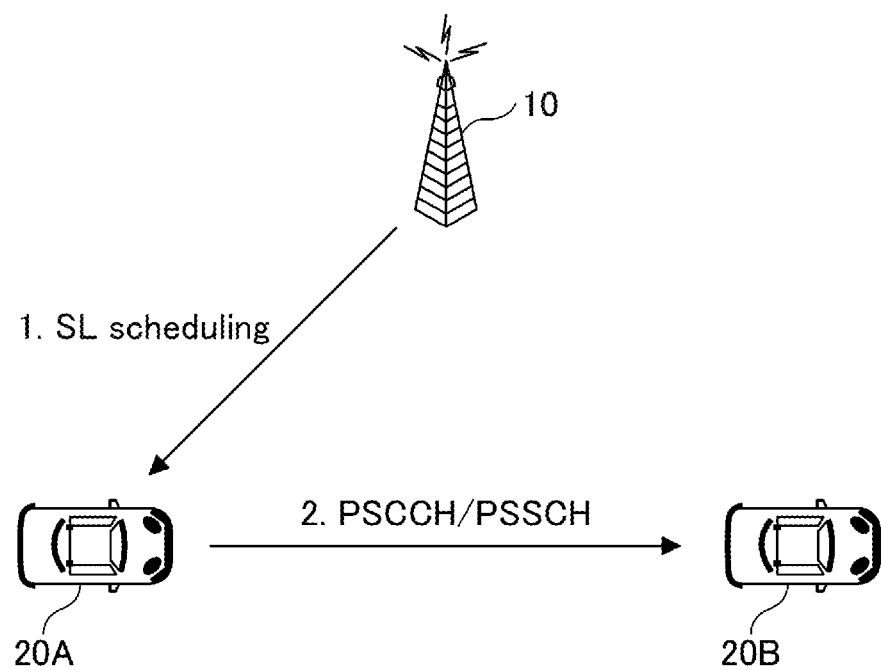
FIG. 2 is a drawing illustrating an example (1) of a V2X transmission mode.

FIG. 2 is a drawing illustrating an example (1) of a V2X transmission mode. In a transmission mode of sidelink communication illustrated in FIG. 2, in step 1, a base station 10 transmits a sidelink scheduling to a terminal 20A. Next, the terminal 20A transmits PSCCH (Physical Sidelink Control Channel) and PSSCH (Physical Sidelink Shared Channel) to a terminal 20B based on the received scheduling (step 2). The transmission mode of sidelink communication illustrated in FIG. 2 may be referred to as a sidelink transmission mode 3 in LTE. In the sidelink transmission mode 3 in LTE, Uu based sidelink scheduling is performed. Uu is a radio interface between UTRAN (Universal Terrestrial Radio Access Network) and UE (User equipment). It should be noted that the transmission mode of sidelink communication illustrated in FIG. 2 may be referred to as a sidelink transmission mode 1 in NR.

Figure 3:
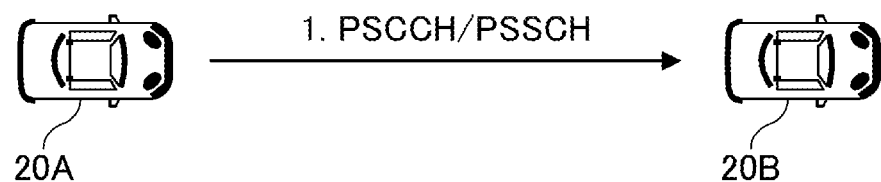
FIG. 3 is a drawing illustrating an example (2) of a V2X transmission mode.

FIG. 3 is a drawing illustrating an example (2) of a V2X transmission mode. In a transmission mode of sidelink communication illustrated in FIG. 3, in step 1, a terminal 20A transmits PSCCH and PSSCH to a terminal 20B using autonomously selected resources. The transmission mode of sidelink communication illustrated in FIG. 3 may be referred to as a sidelink transmission mode 4 in LTE. In the sidelink transmission mode 4 in LTE, the UE itself performs resource selection.

Figure 4:
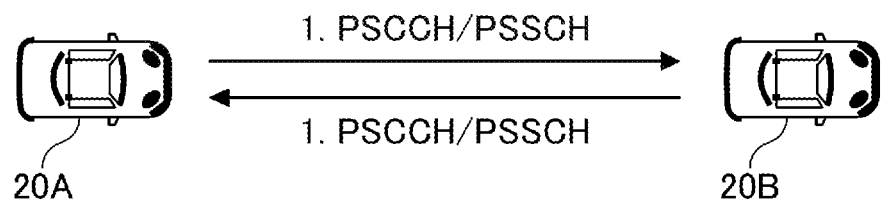
FIG. 4 is a drawing illustrating an example (3) of a V2X transmission mode.

FIG. 4 is a drawing illustrating an example (3) of a V2X transmission mode. In a transmission mode of sidelink communication illustrated in FIG. 4, in step 1, a terminal 20A transmits PSCCH and PSSCH to a terminal 20B using autonomously selected resources. Similarly, the terminal 20B transmits PSCCH and PSSCH to the terminal 20A using autonomously selected resources (step 1) The transmission mode of sidelink communication illustrated in FIG. 4 may be referred to as a sidelink transmission mode 2a in NR. In the sidelink transmission mode 2 in NR, the terminal 20 itself performs resource selection. In NR, the mode in which a terminal 20 selects a resource to perform sidelink transmission may be referred to as a resource allocation mode 2.

Figure 5:
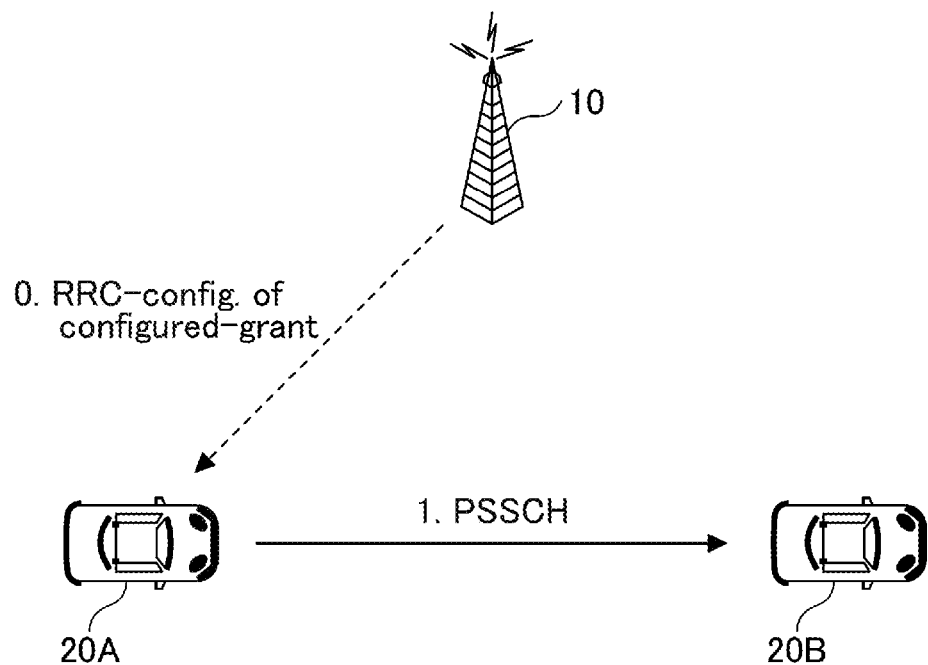
FIG. 5 is a drawing illustrating an example (4) of a V2X transmission mode.

FIG. 5 is a drawing illustrating an example (4) of a V2X transmission mode. In a transmission mode of sidelink communication illustrated in FIG. 5, in step 0, a base station 10 transmits a sidelink grant to a terminal 20A via RRC (Radio Resource Control) configuration. Next, the terminal 20A transmits PSSCH to the terminal 20B based on the received resource pattern (step 1). The transmission mode of sidelink communication illustrated in FIG. 5 may be referred to as a sidelink transmission mode 2c in NR.

Figure 6:
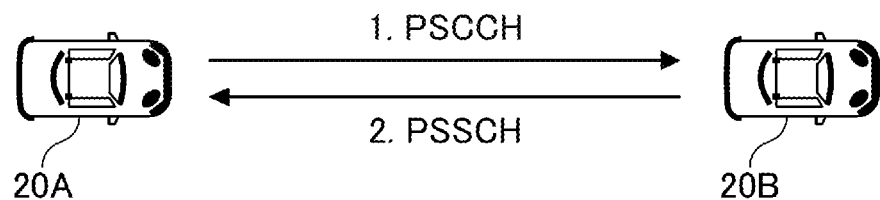
FIG. 6 is a drawing illustrating an example (5) of a V2X transmission mode.

FIG. 6 is a drawing illustrating an example (5) of a V2X transmission mode. In the sidelink communication transmission mode illustrated in FIG. 6, in step 1, the terminal 20A transmits sidelink scheduling to the terminal 20B via PSCCH. Next, the terminal 20B transmits PSSCH to the terminal 20A based on the received scheduling (step 2). The transmission mode of sidelink communication illustrated in FIG. 6 may be referred to as a sidelink transmission mode 2d in NR.

Figure 7:
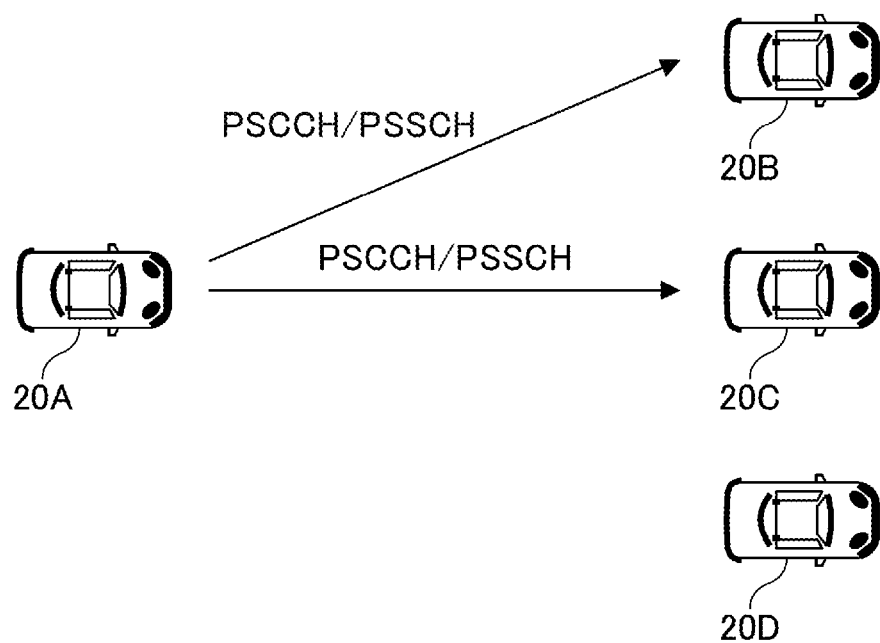
FIG. 7 is a drawing illustrating an example (1) of a V2X communication type.

FIG. 7 is a drawing illustrating an example (1) of a V2X communication type. The sidelink communication type illustrated in FIG. 7 is uni-cast. The terminal 20A transmits PSCCH and PSSCH to terminal 20. In an example illustrated in FIG. 7, the terminal 20A performs uni-cast to the terminal 20B, and performs uni-cast to the terminal 20C.

Figure 8:
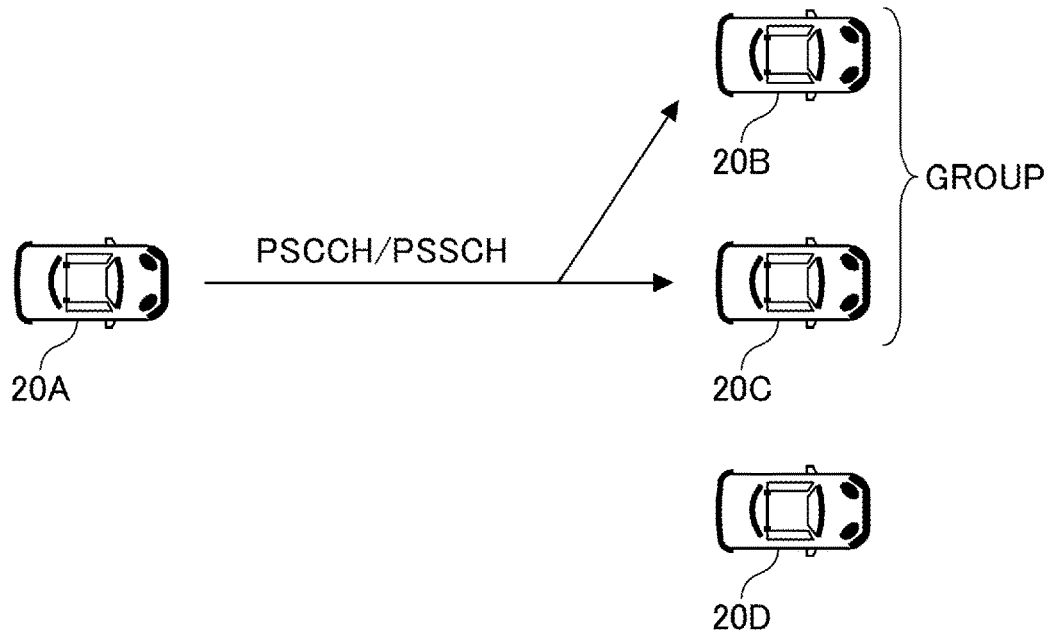
FIG. 8 is a drawing illustrating an example (2) of a V2X communication type.

FIG. 8 is a drawing illustrating an example (2) of a V2X communication type. The sidelink communication type illustrated in FIG. 8 is group-cast. The terminal 20A transmits PSCCH and PSSCH to a group to which one or more terminals 20 belong. In an example illustrated in FIG. 8, the group includes a terminal 20B and a terminal 20C, and the terminal 20A performs group-cast to the group.

Figure 9:
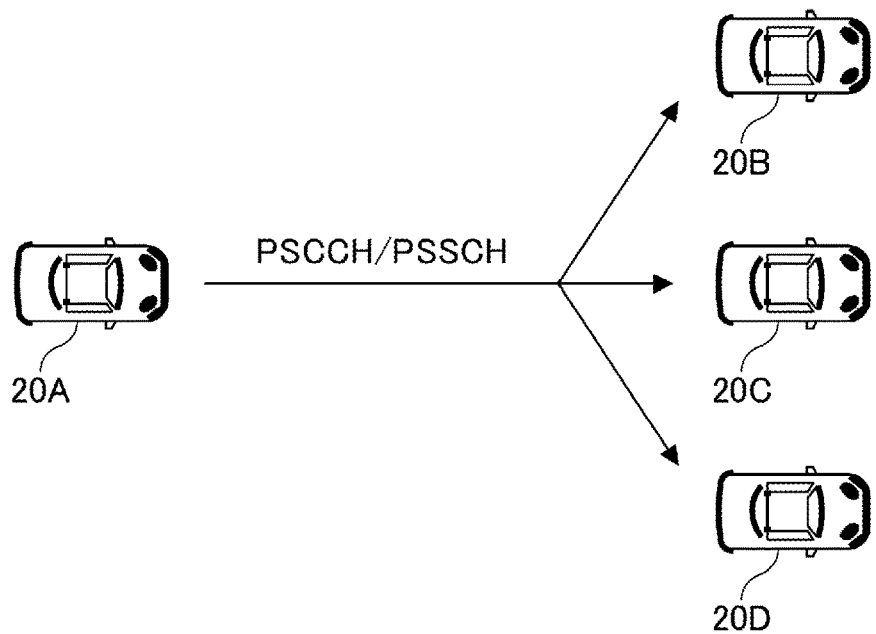
FIG. 9 is a drawing illustrating an example (3) of a V2X communication type.

FIG. 9 is a drawing illustrating an example (3) of a V2X communication type. The sidelink communication type illustrated in FIG. 9 is broad-cast. The terminal 20A transmits PSCCH and PSSCH to one or more terminals 20. In an example illustrated in FIG. 9, the terminal 20A performs broad-cast to terminal 20B, terminal 20C, and terminal 20D. Note that the terminal 20A shown in FIGS. 7 to 9 may be referred to as a header UE.

In addition, it is assumed that a HARQ (Hybrid automatic repeat request) is supported for unicast and groupcast of sidelink in NR-V2X. In addition, SFCI (Sidelink Feedback Control Information) containing a HARQ response is defined in NR-V2X. In addition, SFCI transmission via PSFCH (Physical Sidelink Feedback Channel) is under consideration.

Note that, in the following description, it is assumed that PSFCH is used in the transmission of HARQ-ACK on sidelink. However, this just an example. For example, PSCCH may be used to transmit HARQ-ACK on sidelink, PSSCH may be used to transmit HARQ-ACK on sidelink, or other channels may be used to transmit HARQ-ACK on sidelink.

Hereinafter, for the sake of convenience, the overall information reported by the terminal 20 in the HARQ is referred to as HARQ-ACK. This HARQ-ACK may also be referred to as HARQ-ACK information. Further, more specifically, a codebook applied to the HARQ-ACK information reported from the terminal 20 to the base station 10 or the like is called a HARQ-ACK codebook. The HARQ-ACK codebook defines a bit string (sequence) of the HARQ-ACK information. Note that "HARQ-ACK" sends not only ACK but also NACK.

Figure 10:
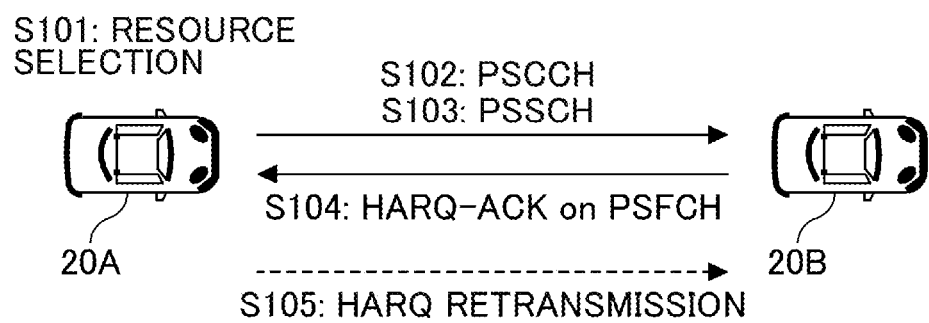
FIG. 10 is a sequence diagram illustrating an example (1) of V2X operation.

FIG. 10 is a sequence diagram illustrating an example (1) of V2X operation. As shown in FIG. 10, the wireless communication system according to 11 an embodiment of the present invention may include a terminal 20A and a terminal 20B. Note that there are many user devices, but FIG. 10 shows a terminal 20A and a terminal 20B as examples.

Hereinafter, when the terminals 20A, 20B, or the like are not particularly distinguished, the term "terminal 20" or "user device" will be simply described. FIG. 10 shows, for example, a case where both the terminal 20A and the terminal 20B are within a coverage of a cell. However, the operation in an embodiment of the present invention embodiment can be applied to a case where the terminal 20B is outside the coverage.

As described above, in an embodiment, the terminal 20 is, for example, a device mounted in a vehicle such as an automobile and has a cellular communication function as a UE in LTE or NR and a sidelink function. Terminal 20 may be a conventional portable terminal (such as a smartphone). Further, the terminal 20 may also be an RSU. The RSU may be a UE-type RSU having the function of a UE or a gNB-type RSU having the function of a base station device.

Note that the terminal 20 need not be a single housing device. For example, even when various sensors are arranged and distributed in a vehicle, a device including the various sensors is may be a terminal 20.

Further, processing contents of sidelink transmission data of the terminal 20 are basically the same as those of UL transmission in LTE or NR. For example, the terminal 20 scrambles a codeword of the transmission data, modulates to generate complex-valued symbols, and maps the complex-valued symbols to one or two layers, and performs precoding. Further, the precoded complex-valued symbols are mapped to a resource element to generate a transmission signal (e.g., complex-valued time-domain SC-FDMA signal) and, and the generated signal is transmitted from each antenna port.

It is noted that the base station 10 has a function of cellular communication as a base station in LTE or NR and a function of enabling communication of the terminal 20 according to an embodiment of the present invention (e.g., resource pool setting, resource allocation, etc.). Further, the base station 10 may also be an RSU (gNB-type RSU).

Further, in the wireless communication system according to an embodiment of the present invention, a signal waveform used by the terminal 20 for SL or UL may be OFDMA, SC-FDMA, or other signal waveforms.

In step S101, the terminal 20A autonomously selects a resource to be used for PSCCH and PSSCH from a resource selection window having a predetermined period. The resource selection window may be configured (set) to the terminal 20 by the base station 10.

In step S102 and Step S103, the terminal 20A transmits, using the resource autonomously selected in step S101, SCI (Sidelink Control Information) via PSCCH and/or PSSCH and transmits SL data via PSSCH. For example, the terminal 20A may transmit the PSCCH using a frequency resource adjacent to the PSSCH frequency resource with the same time resource as at least a portion of the time resource of the PSSCH.

The terminal 20B receives the SCI (PSCCH and/or PSSCH) and the SL data (PSSCH) transmitted from the terminal 20A. The received SCI may include information of a PSFCH resource for the terminal 20B to send HARQ-ACK for reception of the data. The terminal 20A may include information of the autonomously selected resource in the SCI and transmit the included information.

In step S104, the terminal 20B transmits a HARQ-ACK for the received data to the terminal 20A using the PSFCH resource specified by the received SCI.

In step S105, when the HARQ-ACK received in step S104 indicates a request for retransmission, that is, when the HARQ-ACK is a NACK (negative response), the terminal 20A retransmits the PSCCH and the PSSCH to the terminal 20B. The terminal 20A may retransmit the PSCCH and the PSSCH using an autonomously selected resource.

It is noted that, if HARQ control is not performed, step S104 and step S105 may not be performed.

Figure 11:
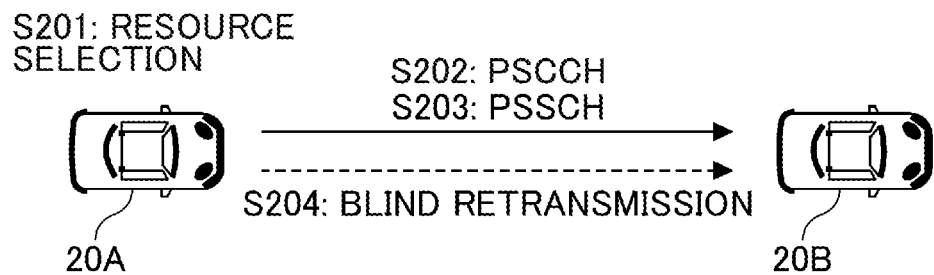
FIG. 11 is a sequence diagram illustrating an example (2) of V2X operation.

FIG. 11 is a sequence diagram illustrating an example (2) of V2X operation. A non-HARQ-control-based blind retransmission may be performed to improve the transmission success rate or reach distance.

In step S201, the terminal 20A autonomously selects a resource to be used for PSCCH and PSSCH from a resource selection window having a predetermined period. The resource selection window may be configured (set) to the terminal 20 by the base station 10.

In step S202 and step S203, the terminal 20A transmits, using the resource autonomously selected in step S201, an SCI via PSCCH and/or PSSCH, and transmits SL data via PSSCH. For example, the terminal 20A may transmit the PSCCH using a frequency resource adjacent to the PSSCH frequency resource with the same time resource as at least a portion of the time resource of the PSSCH.

In step S204, the terminal 20A retransmits, using the resource autonomously selected in step S201, the SCI via PSCCH and/or PSSCH and the SL data via PSSCH to the terminal 20B. The retransmission in step S204 may be performed multiple times.

It is noted that, if the blind retransmission is not performed, step S204 may not be performed.

Figure 12:
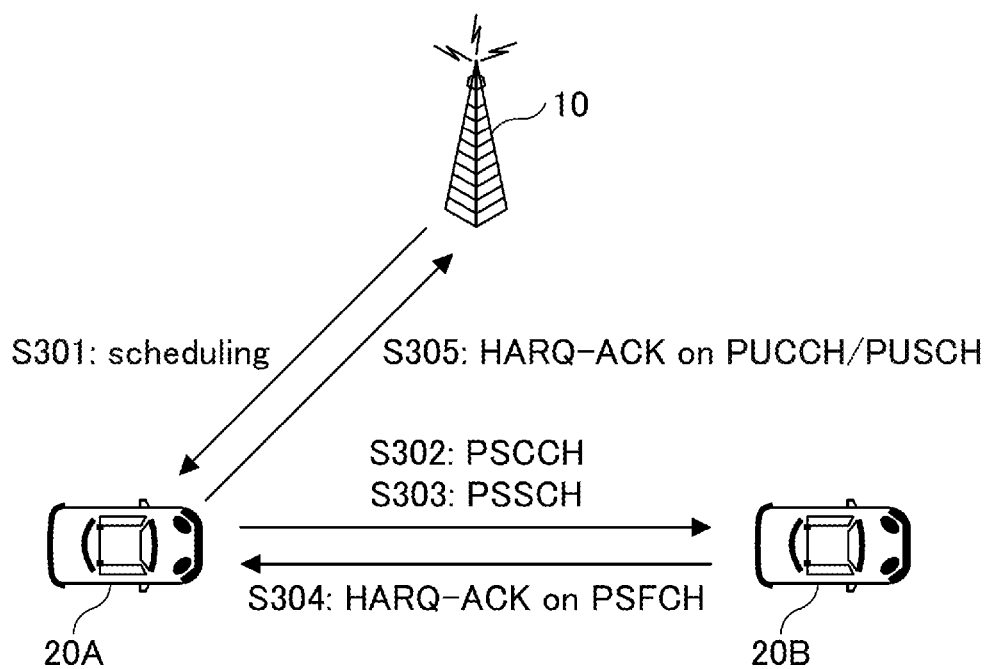
FIG. 12 is a sequence diagram illustrating an example (3) of V2X operation.

FIG. 12 is a sequence diagram illustrating an example (3) of V2X operation. The base station 10 may perform scheduling of the sidelink. That is, the base station 10 may determine a sidelink resource to be used by the terminal 20 and transmit information indicating the resource to the terminal 20. In addition, in a case where HARQ control is applied, the base station 10 may transmit information indicating a PSFCH resource to the terminal 20.

In step S301, the base station 10 performs SL scheduling by sending DCI (Downlink Control Information) to the terminal 20A via PDCCH. Hereafter, for the sake of convenience, the DCI for SL scheduling is called SL scheduling DCI.

Further, in Step S301, it is assumed that the base station 10 also transmits DCI for DL scheduling (which may be referred to as DL assignment) to the terminal 20A via the PDCCH. Hereafter, for the sake of convenience, the DCI for DL scheduling is called a DL scheduling DCI. The terminal 20A, which has received the DL scheduling DCI, receives DL data via PDSCH using a resource specified by the DL scheduling DCI.

In step S302 and step S303, the terminal 20A transmits, sing the resource specified by the SL scheduling DCI, SCI (Sidelink Control Information) via PSCCH and/or PSSCH and transmits SL data via PSSCH. Note that, in the SL scheduling DCI, only a PSSCH resource may be specified. In this case, For example, the terminal 20A may transmit the PSCCH using a frequency resource adjacent to the PSSCH frequency resource with the same time resource as at least a portion of the time resource of the PSSCH.

The terminal 20B receives the SCI (PSCCH and/or PSSCH) and the SL data (PSSCH) transmitted from the terminal 20A. The SCI received via the PSCCH and/or PSSCH includes information of a PSFCH resource for the terminal 20B to send a HARQ-ACK for reception of the data.

The information of the resource is included in the DL scheduling DCI or SL scheduling DCI transmitted from the base station 10 in S301, and the terminal 20A acquires the information of the resource from the DL scheduling DCI or the SL scheduling DCI and includes the acquired information in the SCI. Alternatively, the DCI transmitted from the base station 10 may not include the information of the resource, and the terminal 20A may autonomously include the information of the resource in the SCI and transmit the SCI including the information.

In step S304, the terminal 20B transmits a HARQ-ACK for the received data to the terminal 20A using the PSFCH resource specified by the received SCI.

In step S305, the terminal 20A transmits the HARQ-ACK using, for example, a PUCCH (Physical uplink control channel) resource specified by the DL scheduling DCI (or SL scheduling DCI) at the timing (e.g., slot-by-slot timing) specified by the DL scheduling DCI (or SL scheduling DCI), and the base station 10 receives the HARQ-ACK. The HARQ-ACK codebook may include HARQ-ACK received from the terminal 20B or ARQ-ACK generated based on PSFCH that is not received, and HARQ-ACK for the DL data. Note, however, the HARQ-ACK for DL data is not included if DL data is not allocated. In NR Rel.16, the HARQ-ACK codebook does not include HARQ-ACK for DL data.

It is noted that, if HARQ control is not performed, step S304 and step S305 may not be performed.

Figure 13:
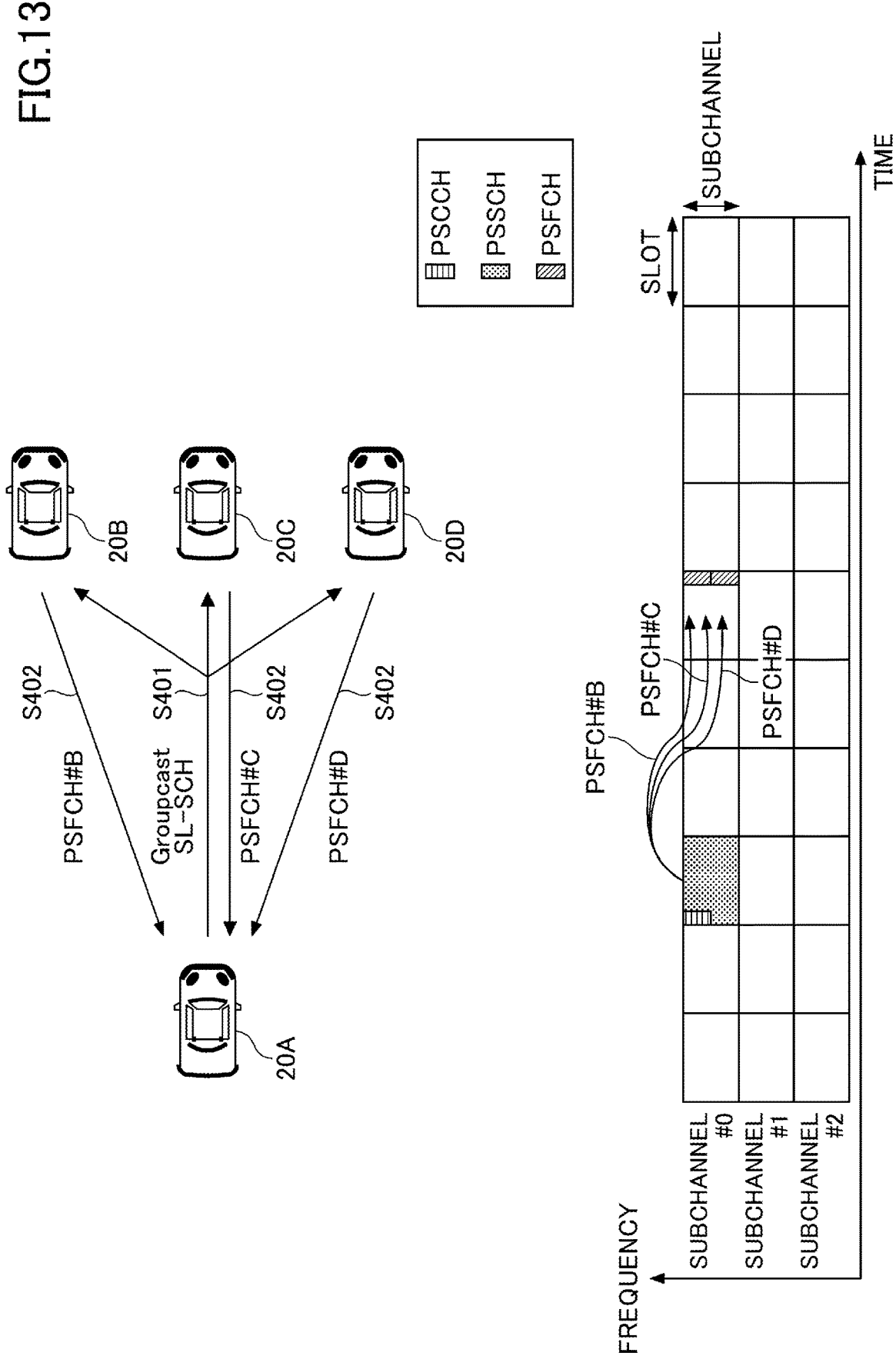
FIG. 13 is a sequence diagram illustrating an example (4) of V2X operation.

FIG. 13 is a sequence diagram illustrating an example (4) of V2X operation. As described above, it is supported in the NR sidelink that the HARQ response is transmitted via PSFCH. It is noted that, with respect to the format of PSFCH, the same format as that of PUCCH (Physical Uplink Control Channel) format 0 can be used, for example. That is, the PSFCH format may be a sequence-based format with a PRB (Physical Resource Block) size of 1, ACK and NACK being identified by sequence differences. The format of PSFCH is not limited to the above-described format. PSFCH resources may be located at the last symbol of a slot or a plurality of last symbols of a slot. Further, a period N may be configured or predefined for the PSFCH resource. The period N may be configured or predefined in a unit of slot.

In FIG. 13, the vertical axis corresponds to the frequency domain and the horizontal axis corresponds to the time domain. PSCCH may be arranged at the first symbol, may be arranged at a plurality of first symbols of a slot, or may be arranged at a plurality of symbols from a symbol other than the first symbol of a slot. PSFCH resources may be arranged at the last symbol of a slot, or may be arranged at a plurality of last symbols. In an example shown in FIG. 13, three sub-channels are configured in a resource pool, and two PSFCHs are arranged in a slot after three slots from a slot in which PSSCH is arranged. Arrows from PSSCH to PSFCH indicate an example of PSFCH associated with PSSCH.

In a case of option 2 where an ACK or NACK is transmitted in a HARQ response in the NR-V2X group-cast, it is necessary to determine resources used for transmitting and receiving PSFCH. As shown in FIG. 13, in step S401, the terminal 20A, which is the transmitting side terminal 20, performs groupcast with respect to the terminal 20B, the terminal 20C, and the terminal 20D, which are the receiving side terminals 20, via SL-SCH. In the subsequent step S402, the terminal 20B uses PSFCH #B, the terminal 20C uses PSFCH #C, and the terminal 20D uses PSFCH #D to transmit HARQ responses to the terminal 20A. Here, as shown in an example of FIG. 13, in a case where the number of PSFCH resources available is less than the number of receiving side terminals 20 belonging to the group, it is necessary to determine how to allocate PSFCH resources. It is noted that the transmitting side terminal 20 may obtain the number of the receiving side terminals 20 in the groupcast.

Here, in NR sidelink, at least one of the three MCS (Modulation and coding scheme) tables as shown in Table 1, Table 2, and Table 3 (refer to Non-Patent Document 3) is supported, for example.

TABLE 1

| MCS Index $I_{MCS}$ | Modulation Order $Q_m$ | Target code Rate R x [1024] | Spectral efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | | reserved |
| 30 | 4 | | reserved |
| 31 | 6 | | reserved |

TABLE 2

| MCS Index $I_{MCS}$ | Modulation Order $Q_m$ | Target code Rate R x [1024] | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 378 | 1.4766 |
| 6 | 4 | 434 | 1.6953 |
| 7 | 4 | 490 | 1.9141 |
| 8 | 4 | 553 | 2.1602 |
| 9 | 4 | 616 | 2.4063 |
| 10 | 4 | 658 | 2.5703 |
| 11 | 6 | 466 | 2.7305 |
| 12 | 6 | 517 | 3.0293 |
| 13 | 6 | 567 | 3.3223 |
| 14 | 6 | 616 | 3.6094 |
| 15 | 6 | 666 | 3.9023 |
| 16 | 6 | 719 | 4.2129 |
| 17 | 6 | 772 | 4.5234 |
| 18 | 6 | 822 | 4.8164 |
| 19 | 6 | 873 | 5.1152 |
| 20 | 8 | 682.5 | 5.3320 |
| 21 | 8 | 711 | 5.5547 |
| 22 | 8 | 754 | 5.8906 |
| 23 | 8 | 797 | 6.2266 |
| 24 | 8 | 841 | 6.5703 |
| 25 | 8 | 885 | 6.9141 |
| 26 | 8 | 916.5 | 7.1602 |
| 27 | 8 | 948 | 7.4063 |
| 28 | 2 | | reserved |
| 29 | 4 | | reserved |
| 30 | 6 | | reserved |
| 31 | 8 | | reserved |

TABLE 3

| MCS Index $I_{MCS}$ | Modulation Order $Q_m$ | Target code Rate R x [1024] | Spectral efficiency |
|---|---|---|---|
| 0 | 2 | 30 | 0.0586 |
| 1 | 2 | 40 | 0.0781 |
| 2 | 2 | 50 | 0.0977 |
| 3 | 2 | 64 | 0.1250 |
| 4 | 2 | 78 | 0.1523 |
| 5 | 2 | 99 | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 4 | 340 | 1.3281 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 6 | 438 | 2.5664 |
| 22 | 6 | 466 | 2.7305 |
| 23 | 6 | 517 | 3.0293 |
| 24 | 6 | 567 | 3.3223 |
| 25 | 6 | 616 | 3.6094 |
| 26 | 6 | 666 | 3.9023 |
| 27 | 6 | 719 | 4.2129 |
| 28 | 6 | 772 | 4.5234 |
| 29 | 2 | | reserved |
| 30 | 4 | | reserved |
| 31 | 6 | | reserved |

As shown in Tables 1, 2 and 3, in MCS tables, a modulation order (Modulation Order: Qm), a target code rate (Target Code Rate: R×[1024]) and spectral efficiency, associated with an MCS index (MCS Index: IMCS) are defined. Table 1 is an MCS table that supports from QPSK (Quadrature phase shift keying) to 64 QAM (Quadrature amplitude modulation). Table 2 is an MCS table that supports from QPSK to 256QAM. Table 3 is an MCS table used primarily for URLLC (Ultra-Reliable and Low Latency Communications).

FIG. 14 is a drawing illustrating an example of a parameter(s) related to MCS. The MCS table used by the terminal 20 is configured or predefined as a parameter "sl-MCS-Table-r16", for example. As shown in FIG. 14, in "sl-MCS-Table-r16", "qam64" corresponding to Table 1, "qam256" corresponding to Table 2, or "qam64LowSE" corresponding to Table 3 is configured.

In resource allocation mode 1 (TXmode1) in which the base station 10 allocates resources used for sidelink transmission to the terminal 20, a parameter "sl-MinMCS-PSSCH-r16" and a parameter "sl-MaxMCS-PSSCH-r16", indicating which MCS index is to be used from the configured MCS table, can be configured. The terminal 20 can use MCS indexes from "sl-MinMCS-PSSCH-r16" to "sl-MaxMCS-PSSCH-r16". For example, as shown in FIG. 14, MCS indexes from 0 to 27 can be set to "sl-MinMCS-PSSCH-r16", and MCS indexes from 0 to 31 can be set to "sl-MaxMCS-PSSCH-r16".

In addition, multiple MCS tables that can be used by the terminal 20 may be configured or predefined. For example, a parameter "sl-MCS-Table-r16" specifying the first MCS table and a parameter "sl-MCS-Table-r16" specifying the second MCS table may be defined. Alternatively, for example, a parameter "sl-MCS-Table-r16" may be defined to include multiple MCS tables. In a case where multiple MCS tables are configured or predefined, for example, which MCS table is to be used may be indicated by PHY layer signaling, such as SCI or DCI.

Here, it is unclear how the parameters "sl-MinMCS-PSSCH-r16" and "sl-MaxMCS-PSSCH-r16" are applied, for example, when multiple MCS tables are configured or specified.

Here, in a case where a plurality of MCS tables is configured or predefined, in the resource allocation mode 1, the terminal 20 may determine a range of available MCS indices according to a predetermined method.

Figure 15:
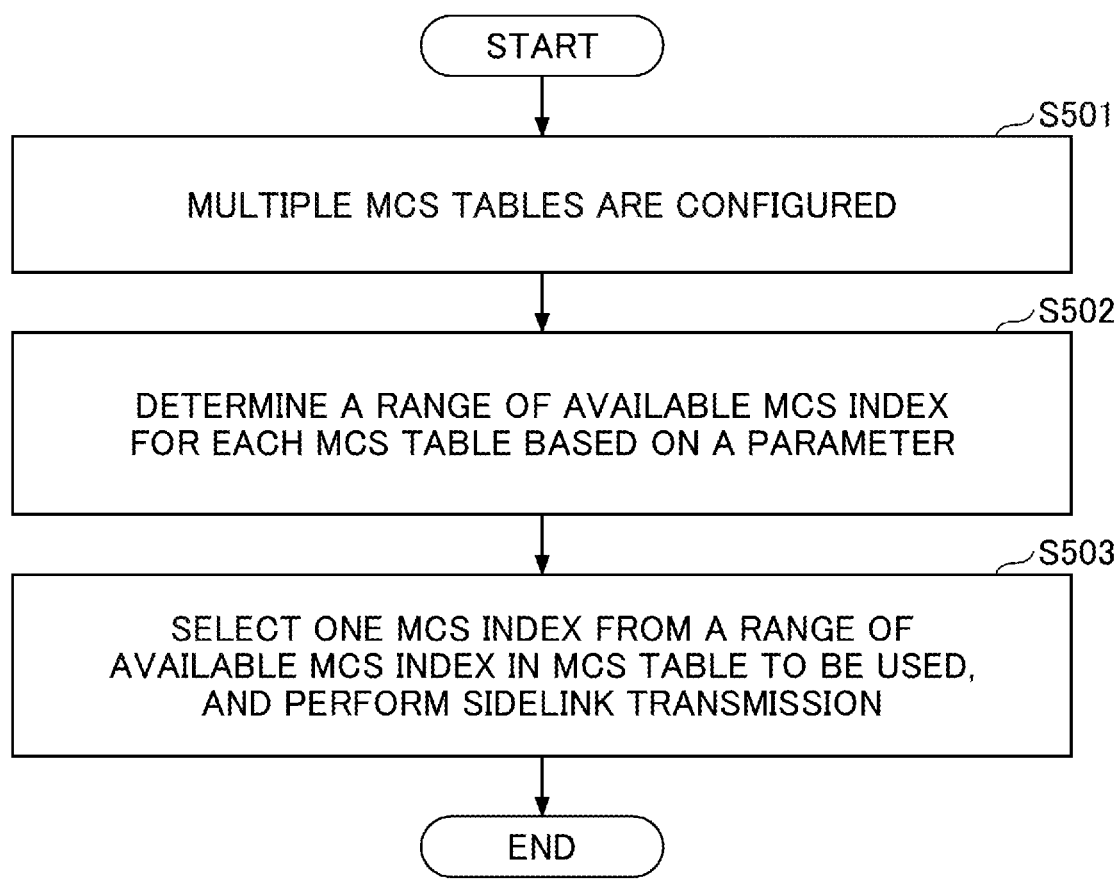
FIG. 15 is a flowchart illustrating a configuration example (1) of MCS according to an embodiment of the present invention.

FIG. 15 is a flowchart illustrating a configuration example (1) of MCS according to an embodiment of the present invention. In step S501, a plurality of MCS tables are configured. For example, the base station 10 may configure a plurality of MCS tables to the terminal 20. Subsequently, the terminal 20 determines a range of available MCS indexes for each MCS table based on parameters (S502). For example, in a case where two MCS tables are configured, the parameters may be configured or predefined as follows.

sl-MinMCS-PSSCH-r16 and sl-MaxMCS-PSSCH-r16 may be configured as parameters that define a range of MCS indices for the first MCS table. For example, in a case where one of the parameters sl-MinMCS-PSSCH-r16 and sl-MaxMCS-PSSCH-r16 is not configured, the range of MCS indices by the configured one of the parameters may be applied, and an upper or lower limit of MCS indices by the parameter not configured may be determined by the implementation of the terminal 20. In addition, in a case where none of the parameters, sl-MinMCS-PSSCH-r16 and sl-MaxMCS-PSSCH-r16 is configured, any MCS index may be used.

Further, sl-MinMCS-PSSCH2-r16 and sl-MaxMCS-PSSCH2-r16 may be configured as parameters that define a range of MCS indices for the second MCS table. For example, if one of the parameters sl-MinMCS-PSSCH2-r16 and sl-MaxMCS-PSSCH2-r16 is not configured, the range of MCS indices by the configured one of the parameters may be applied, and an upper or lower limit of MCS indices by the parameter not configured may be determined by the implementation of the terminal 20. In addition, in a case where none of the parameters, sl-MinMCS-PSSCH2-r16 and sl-MaxMCS-PSSCH2-r16 is configured, any MCS index may be used.

The range of MCS indices that can be used may be different for each MCS table. That is, a range of available MCS indices in the first MCS table specified by sl-MinMCS-PSSCH-r16 and sl-MaxMCS-PSSCH-r16 may be different from a range of available MCS indices in the second MCS table specified by sl-MinMCS-PSSCH2-r16 and sl-MaxMCS-PSSCH2-r16.

In step S503, the terminal 20 selects one MCS index from the range of available MCS indices of the MCS table to be used and performs sidelink transmission. The terminal 20 may determine which MCS table to use based on PHY layer signaling, such as SCI or DCI.

Figure 16:
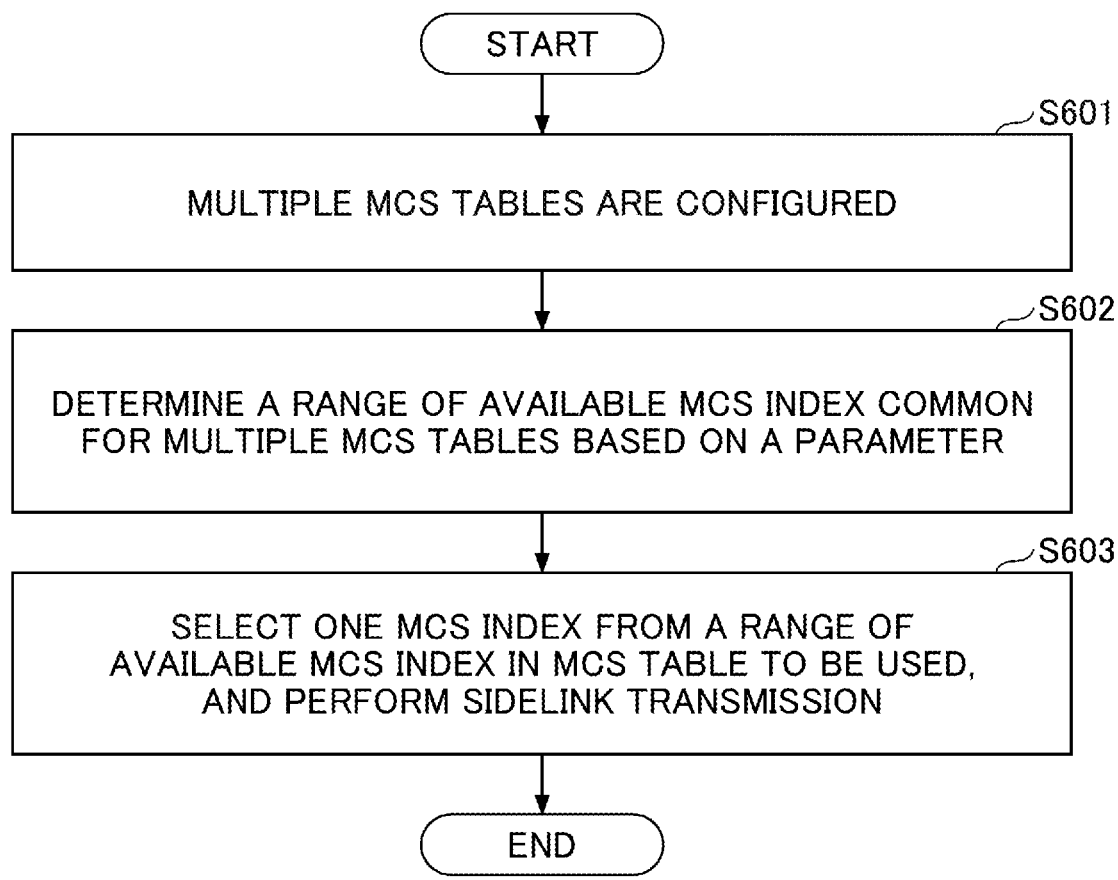
FIG. 16 is a flowchart illustrating a configuration example (2) of MCS according to an embodiment of the present invention.

FIG. 16 is a flowchart illustrating a configuration example (2) of MCS according to an embodiment of the present invention. In step S601, a plurality of MCS tables are configured. For example, the base station 10 may configure a plurality of MCS tables to the terminal 20. Subsequently, the terminal 20 determines a range of available MCS indices common for MCS tables based on parameters (S602). For example, sl-MinMCS-PSSCH-r16 and sl-MaxMCS-PSSCH-r16 may be parameters that define the range of available MCS indexes for any of the configured plurality of MCS tables.

In addition, the range of available MCS indexes in at least one of the MCS tables may be adjusted from the values of the above parameters. For example, sl-MinMCS-PSSCH-r16 and sl-MaxMCS-PSSCH-r16 may define a range of available MCS indexes for the first MCS table, and the range of available MCS indexes for the second MCS table may be a range that achieves a target code rate equivalent to the first MCS table.

FIG. 17 is a drawing illustrating an example of applying parameters according to an embodiment of the present invention. As shown in FIG. 17, sl-MinMCS-PSSCH-r16 and sl-MaxMCS-PSSCH-r16 are parameters defining the range of available MCS indices for the MCS table of Table 1, with MCS indices being available from 2 to 15. The corresponding target code rate ranges from 193 to 616 in Table 1. Because the MCS indices corresponding to the range of achieving equivalent target code rate in Table 2 are from 1 to 14, a range of MCS indices from 1 to 14 for the MCS tables in Table 2 may be available.

Similarly, the, sl-MinMCS-PSSCH-r16 and sl-MaxMCS-PSSCH-r16 may define a range of available MCS indices for the first MCS table, and the range of available MCS indices for the second MCS table may be a range that achieves spectral efficiency equivalent to the first MCS table.

Further, for example, sl-MinMCS-PSSCH-r16 and sl-MaxMCS-PSSCH-r16 may define a range of available MCS indices for the first MCS table, and the range of available MCS indices for the second MCS table may be a range that achieves a target code rate greater than or less than the code rate of the first MCS table.

Further, for example, sl-MinMCS-PSSCH-r16 and sl-MaxMCS-PSSCH-r16 may define a range of available MCS indices for the first MCS table, and the range of available MCS indices for the second MCS table may be a range that achieves spectral efficiency greater than or less than the spectral efficiency of the first MCS table.

Further, for example, sl-MinMCS-PSSCH-r16 and sl-MaxMCS-PSSCH-r16 may define a range of available MCS indices for the first MCS table, and a range of available MCS indices for the second MCS table may be a range of sl-MinMCS-PSSCH-r16 and sl-MaxMCS-PSSCH-r16 adding specific offsets. The specific offsets may be defined, configured, configured in advance, or indicated.

Return to FIG. 16. In step S603, the terminal 20 selects one MCS index from the range of available MCS indices of the MCS table to be used and performs sidelink transmission. The terminal 20 may determine which MCS table is to be used based on PHY layer signaling, such as SCI or DCI.

According to the above-described embodiment, in a case where a plurality of MCS tables are configured, the operation of the terminal 20 related to the determination of MCS in the resource allocation mode 1 can be clarified. In addition, the terminal 20 can flexibly configure an available range of the MCS table. Further, the terminal 20 can simplify a configuration for specifying the MCS index in a case where a plurality of MCS tables are configured.

In other words, a code rate can be appropriately configured in the terminal-to-terminal direct communication.

(Apparatus configuration) Next, a functional configuration example of the base station 10 and the terminal 20 for performing the processes and operations described above will be described. The base station 10 and terminal 20 include functions for implementing the embodiments described above. It should be noted, however, that each of the base stations 10 and the terminal 20 may include only some of the functions in an embodiment.

<Base Station 10>

Figure 18:
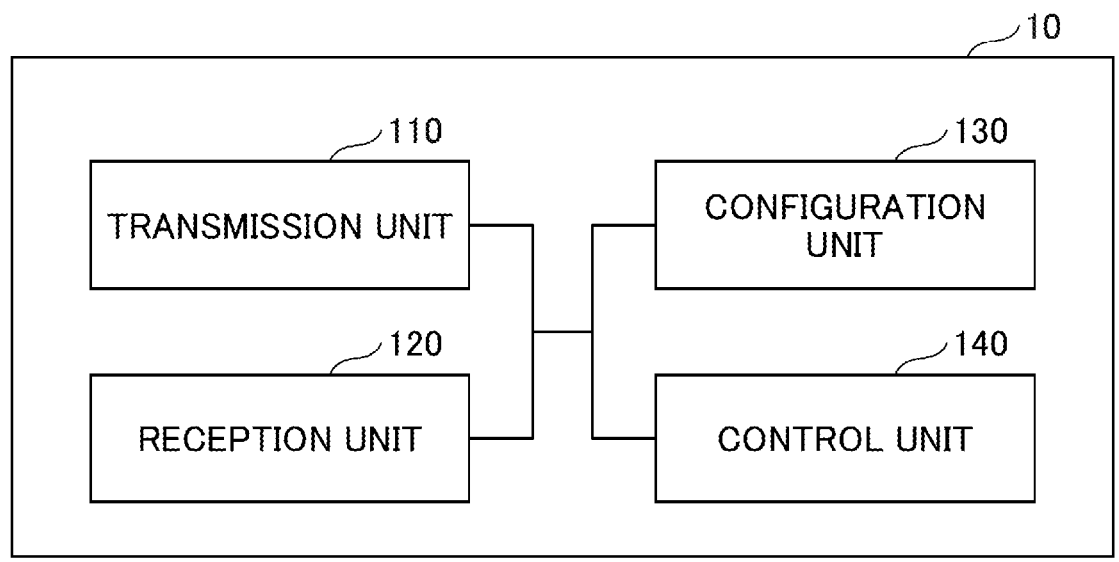
FIG. 18 is drawing illustrating an example of a functional structure of a base station 10 according to an embodiment of the present invention.

FIG. 18 is a diagram illustrating an example of a functional configuration of the base station 10. As shown in FIG. 18, the base station 10 includes a transmission unit 110, a reception unit 120, a configuration unit 130, and a control unit 140. The functional structure illustrated in FIG. 18 is merely an example. Functional divisions and names of functional units may be anything as long as it can perform operations according to an embodiment of the present invention.

The transmission unit 110 includes a function for generating a signal to be transmitted to the terminal 20 side and transmitting the signal wirelessly. The reception unit 120 includes a function for receiving various signals transmitted from the terminal 20 and acquiring, for example, information of a higher layer from the received signals. Further, the transmission unit 110 has a function to transmit NR-PSS, NR-SSS, NR-PBCH, DL/UL control signals, DL reference signals, and the like to the terminal 20.

The configuration unit 130 stores preset configuration information and various configuration information items to be transmitted to the terminal 20 in a storage apparatus and reads the preset configuration information from the storage apparatus if necessary. Contents of the configuration information are, for example, information related to MCS configuration of D2D communication, etc.

As described in an embodiment, the control unit 140 performs processing related to the configuration in which the terminal 20 performs D2D communication. Further, the control unit 140 transmits scheduling of D2D communication and DL communication to the terminal 20 through the transmission unit 110. Further, the control unit 140 receives information related to the HARQ response of the D2D communication and the DL communication from the terminal 20 via the reception unit 120. The functional units related to signal transmission in the control unit 140 may be included in the transmission unit 110, and the functional units related to signal reception in the control unit 140 may be included in the reception unit 120.

<Terminal 20>

Figure 19:
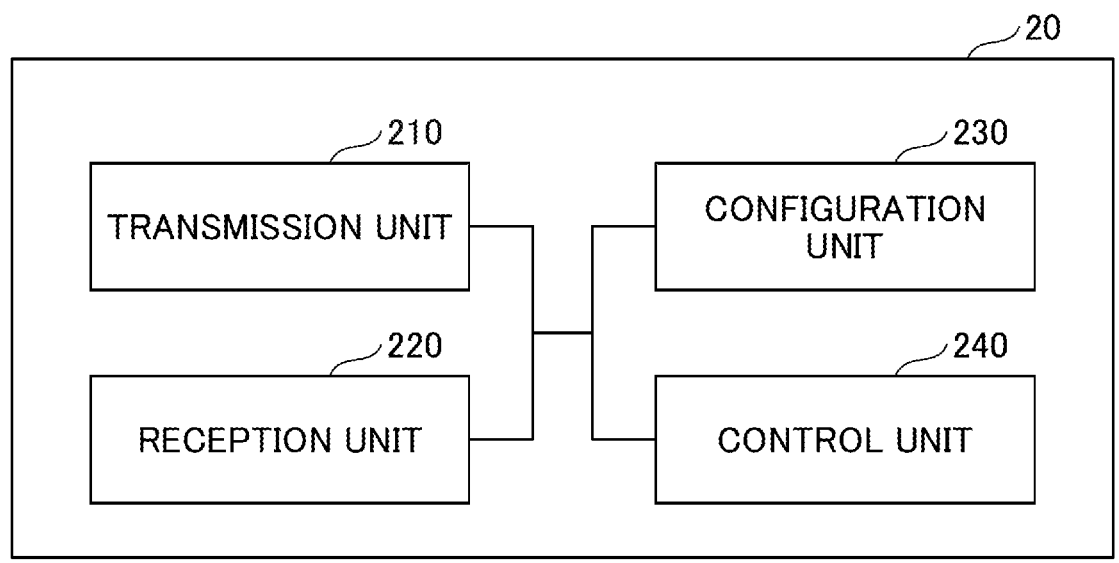
FIG. 19 is drawing illustrating an example of a functional structure of a terminal 20 according to an embodiment of the present invention.

FIG. 19 is a diagram illustrating an example of a functional configuration of the terminal 20. As shown in FIG. 19, the terminal 20 includes a transmission unit 210, a reception unit 220, a configuration unit 230, and a control unit 240. The functional structure illustrated in FIG. 19 is merely an example. Functional divisions and names of functional units may be anything as long as it can perform operations according to an embodiment of the present invention.

The transmission unit 210 generates a transmission signal from transmission data and transmits the transmission signal wirelessly. The reception unit 220 receives various signals wirelessly and obtains upper layer signals from the received physical layer signals. Further, the reception unit 220 has a function for receiving NR-PSS, NR-SSS, NR-PBCH, DL/UL/SL control signals, or reference signals transmitted from the base station 10. Further, for example, with respect to the D2D communications, the transmission unit 210 transmits, to another terminal 20, PSCCH (Physical Sidelink Control Channel), PSSCH (Physical Sidelink Shared Channel), PSDCH (Physical Sidelink Discovery Channel), PSBCH (Physical Sidelink Broadcast Channel), etc., and the reception unit 220 receives, from the another terminal 20, PSCCH, PSSCH, PSDCH, or PSBCH.

The configuration unit 230 stores various configuration information received from the base station 10 or the terminal 20 by the receiving unit 220 in the storage apparatus and reads them from the storage apparatus as necessary. Further, the configuration unit 230 stores preset configuration information. Contents of the configuration information are, for example, information related to MCS configuration of D2D communication, etc.

The control unit 240 controls D2D communication with another terminal 20 as described in an embodiment of the present invention. Further, the control unit 240 performs HARQ related processing of the D2D communication and DL communication. Further, the control unit 240 transmits, to the base station 10, information related to the HARQ response of the D2D communication to the other terminal 20 and of the DL communication, scheduled by the base station 10. Further, the control unit 240 may perform scheduling of D2D communication for another terminal 20. Further, the control unit 240 may autonomously select resources used for D2D communication from the resource selection window based on a sensing result. Further, the control unit 240 performs processing related to MCS configuration of the D2D communication. The functional units related to signal transmission in the control unit 240 may be included in the transmission unit 210, and the functional units related to signal reception in the control unit 240 may be included in the reception unit 220.

(Hardware Structure)

In the above functional structure diagrams used for describing an embodiment of the present invention (FIG. 18 and FIG. 19), functional unit blocks are shown. The functional blocks (function units) are realized by a freely-selected combination of hardware and/or software. Further, realizing means of each functional block is not limited in particular. In other words, each functional block may be realized by a single apparatus in which multiple elements are coupled physically and/or logically, or may be realized by two or more apparatuses that are physically and/or logically separated and are physically and/or logically connected (e.g., wired and/or wireless). The functional blocks may be realized by combining the above-described one or more apparatuses with software.

Functions include, but are not limited to, judging, determining, calculating, processing, deriving, investigating, searching, checking, receiving, transmitting, outputting, accessing, resolving, selecting, establishing, comparing, assuming, expecting, and deeming; broadcasting, notifying, communicating, forwarding, configuring, reconfiguring, allocating, mapping, and assigning, etc. For example, a functional block (component) that functions to transmit is called a transmitting unit or a transmitter. In either case, as described above, the implementation method is not particularly limited.

Figure 20:
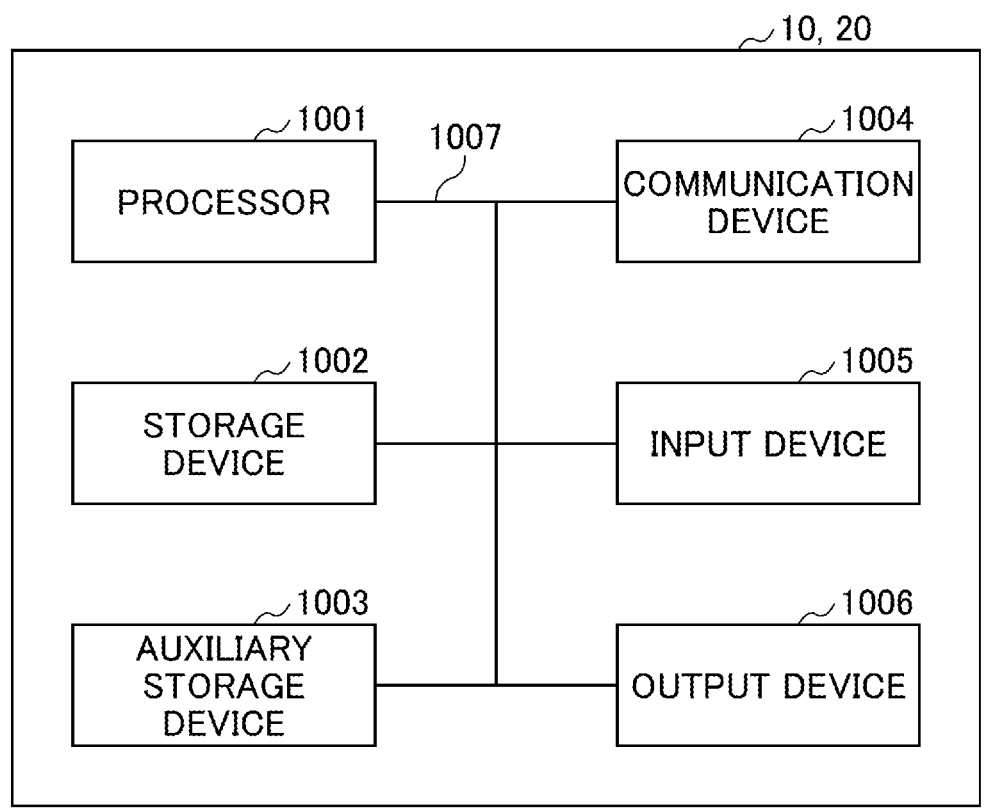
FIG. 20 is a drawing illustrating an example of a hardware structure of a base station 10 or a terminal 20 according to an embodiment of the present invention.

For example, the base station 10, terminal 20, etc., according to an embodiment of the present disclosure may function as a computer for processing the radio communication method of the present disclosure. FIG. 20 is a drawing illustrating an example of hardware structures of the base station 10 and terminal 20 according to an embodiment of the present invention. Each of the above-described base station 10 and the terminal 20 may be physically a computer device including a processor 1001, a storage device 1002, an auxiliary storage device 1003, a communication device 1004, an input device 1005, an output device 1006, a bus 1007, etc.

It should be noted that, in the descriptions below, the term "apparatus" can be read as a circuit, a device, a unit, etc. The hardware structures of the base station 10 and terminal 20 may include one or more of each of the devices illustrated in the figure, or may not include some devices.

Each function in the base station 10 and terminal 20 is realized by having the processor 1001 perform an operation by reading predetermined software (programs) onto hardware such as the processor 1001 and the storage device 1002, and by controlling communication by the communication device 1004 and controlling at least one of reading and writing of data in the storage device 1002 and the auxiliary storage device 1003.

The processor 1001 controls the entire computer by, for example, controlling the operating system. The processor 1001 may include a central processing unit (CPU) including an interface with a peripheral apparatus, a control apparatus, a calculation apparatus, a register, etc. For example, the above-described control unit 140, control unit 240, and the like, may be implemented by the processor 1001.

Further, the processor 1001 reads a program (program code), a software module, or data from the auxiliary storage apparatus 1003 and/or the communication apparatus 1004, and performs various processes according to the program, the software module, or the data. As the program, a program is used that causes the computer to perform at least a part of operations according to an embodiment of the present invention described above. For example, the control unit 140 of the base station 10 illustrated in FIG. 18 may be realized by control programs that are stored in the storage device 1002 and are executed by the processor 1001. Further, for example, the control unit 240 of the terminal 20 illustrated in FIG. 19 may be realized by control programs that are stored in the storage device 1002 and are executed by the processor 1001. The various processes have been described to be performed by a single processor 1001. However, the processes may be performed by two or more processors 1001 simultaneously or sequentially. The processor 1001 may be implemented by one or more chips. It should be noted that the program may be transmitted from a network via a telecommunication line.

The storage apparatus 1002 is a computer-readable recording medium, and may include at least one of a ROM (Read Only Memory), an EPROM (Erasable Programmable ROM), an EEPROM (Electrically Erasable Programmable ROM), a RAM (Random Access Memory), etc. The storage apparatus 1002 may be referred to as a register, a cache, a main memory, etc. The storage apparatus 1002 is capable of storing programs (program codes), software modules, or the like, that are executable for performing communication processes according to an embodiment of the present invention.

The auxiliary storage apparatus 1003 is a computer-readable recording medium, and may include at least one of, for example, an optical disk such as a CD-ROM (Compact Disc ROM), a hard disk drive, a flexible disk, a magneto optical disk (e.g., compact disk, digital versatile disk, Blu-ray (registered trademark) disk), a smart card, a flash memory (e.g., card, stick, key drive), a floppy (registered trademark) disk, a magnetic strip, etc. The above recording medium may be a database including the storage apparatus 1002 and/or the auxiliary storage apparatus 1003, a server, or any other appropriate medium.

The communication apparatus 1004 is hardware (transmission and reception device) for communicating with computers via at least one of a wired network and a wireless network, and may be referred to as a network device, a network controller, a network card, a communication module, etc. The communication apparatus 1004 may comprise a high frequency switch, duplexer, filter, frequency synthesizer, or the like, for example, to implement at least one of a frequency division duplex (FDD) and a time division duplex (TDD). For example, the transmitting/receiving antenna, the amplifier unit, the transmitting/receiving unit, the transmission line interface, and the like, may be implemented by the communication device 1004. The transmitting/receiving unit may be physically or logically divided into a transmitting unit and a receiving unit.

The input apparatus 1005 is an input device that receives an external input (e.g., keyboard, mouse, microphone, switch, button, sensor). The output apparatus 1006 is an output device that outputs something to the outside (e.g., display, speaker, LED lamp). It should be noted that the input device 1005 and the output device 1006 may be integrated into a single device (e.g., touch panel).

Further, the apparatuses including the processor 1001, the storage apparatus 1002, etc., are connected to each other via the bus 1007 used for communicating information. The bus 1007 may include a single bus, or may include different buses between the apparatuses.

Further, each of the base station 10 and terminal 20 may include hardware such as a micro processor, a digital signal processor (DSP), an ASIC (Application Specific Integrated Circuit), a PLD (Programmable Logic Device), a FPGA (Field Programmable Gate Array), etc., and a part or all of each functional block may be realized by the hardware. For example, the processor 1001 may be implemented by at least one of the above hardware elements.

(Embodiment Summary)

As described above, according to an embodiment of the present invention, provided is a terminal including: a reception unit configured to receive information related to MCS (Modulation and coding scheme) applied to a terminal-to-terminal direct communication; a control unit configured to determine, in a case where a plurality of MCS tables are configured by the information, which of the MCS tables is to be used, and to determine MCS from the determined MCS table; and a communication unit configured to perform the terminal-to-terminal direct communication using the determined MCS, wherein the control unit determines an upper limit and a lower limit of available MCSs in the determined MCS table, based on a parameter included in the information.

According to the above embodiment, in a case where a plurality of MCS tables are configured, the operation of the terminal 20 related to the determination of MCS in the resource allocation mode 1 can be clarified. In addition, the terminal 20 can flexibly configure an available range of the MCS table. Further, the terminal 20 can simplify a configuration for specifying the MCS index in a case where a plurality of MCS tables are configured. In other words, a code rate can be appropriately configured in the terminal-to-terminal direct communication.

the control unit may determine an upper or lower limit of the available MCS configured in each of the plurality of MCS tables based on parameters included in the information. With this configuration, in a case where a plurality of MCS tables are configured, the operation of the terminal 20 related to the determination of MCS in the resource allocation mode 1 can be clarified. In addition, the terminal 20 can flexibly configure an available range of the MCS table.

The control unit may determine upper and lower limits of available MCSs configured in any one of the plurality of MCS tables based on parameters included in the information. With this configuration, in a case where a plurality of MCS tables are configured, the operation of the terminal 20 related to the determination of MCS in the resource allocation mode 1 can be clarified. Further, the terminal 20 can simplify a configuration for specifying the MCS index in a case where a plurality of MCS tables are configured.

The control unit may determine an upper limit and a lower limit of available MCSs of a MCS table other than any one of the plurality of MCS tables so as to be within a range of a target code rate equivalent to a range of a target code rate corresponding to an upper limit and a lower limit of available MCSs configured in the determined any one of the MCS tables. With this configuration, in a case where a plurality of MCS tables are configured, the operation of the terminal 20 related to the determination of MCS in the resource allocation mode 1 can be clarified. Further, the terminal 20 can simplify a configuration for specifying the MCS index in a case where a plurality of MCS tables are configured.

the control unit may determine an upper limit and a lower limit of available MCSs of a MCS table other than any one of the plurality of MCS tables so as to be within a range of spectral efficiency equivalent to a range of spectral efficiency corresponding to an upper limit and a lower limit of available MCSs configured in the determined any one of the MCS tables. With this configuration, in a case where a plurality of MCS tables are configured, the operation of the terminal 20 related to the determination of MCS in the resource allocation mode 1 can be clarified. Further, a configuration can be simplified for specifying the MCS index in a case where a plurality of MCS tables are configured.

As described above, according to an embodiment of the present invention, provided is a communication method including: a reception procedure of receiving information related to MCS (Modulation and coding scheme) applied to a terminal-to-terminal direct communication; a control procedure of determining, in a case where a plurality of MCS tables are configured by the information, which of the MCS tables is to be used, and determining MCS from the determined MCS table; and a communication procedure of performing the terminal-to-terminal direct communication using the determined MCS, wherein the control procedure includes a procedure of determining an upper limit and a lower limit of available MCSs in the determined MCS table, based on a parameter included in the information.

According to the above embodiment, in a case where a plurality of MCS tables are configured, the operation of the terminal 20 related to the determination of MCS in the resource allocation mode 1 can be clarified. In addition, the terminal 20 can flexibly configure an available range of the MCS table. Further, the terminal 20 can simplify a configuration for specifying the MCS index in a case where a plurality of MCS tables are configured. In other words, a code rate can be appropriately configured in the terminal-to-terminal direct communication.

(Supplement of Embodiment)

As described above, one or more embodiments have been described. The present invention is not limited to the above embodiments. A person skilled in the art should understand that there are various modifications, variations, alternatives, replacements, etc., of the embodiments. In order to facilitate understanding of the present invention, specific values have been used in the description. However, unless otherwise specified, those values are merely examples and other appropriate values may be used. The division of the described items may not be essential to the present invention. The things that have been described in two or more items may be used in a combination if necessary, and the thing that has been described in one item may be appropriately applied to another item (as long as there is no contradiction). Boundaries of functional units or processing units in the functional block diagrams do not necessarily correspond to the boundaries of physical parts. Operations of multiple functional units may be physically performed by a single part, or an operation of a single functional unit may be physically performed by multiple parts. The order of sequences and flowcharts described in an embodiment of the present invention may be changed as long as there is no contradiction. For the sake of description convenience, the base station 10 and the terminal 20 have been described by using functional block diagrams. However, the apparatuses may be realized by hardware, software, or a combination of hardware and software. The software executed by a processor included in the base station 10 according to an embodiment of the present invention and the software executed by a processor included in the terminal 20 according to an embodiment of the present invention may be stored in a random access memory (RAM), a flash memory, a read only memory (ROM), an EPROM, an EEPROM, a register, a hard disk (HDD), a removable disk, a CD-ROM, a database, a server, or any other appropriate recording medium.

Further, information indication (transmission, notification) may be performed not only by methods described in an aspect/embodiment of the present specification but also a method other than those described in an aspect/embodiment of the present specification. For example, the information transmission may be performed by physical layer signaling (e.g., DCI (Downlink Control Information), UCI (Uplink Control Information)), upper layer signaling (e.g., RRC (Radio Resource Control) signaling, MAC (Medium Access Control) signaling, broadcast information (MIB (Master Information Block), SIB (System Information Block))), other signals, or combinations thereof. Further, RRC signaling may be referred to as an RRC message. The RRC signaling may be, for example, an RRC connection setup message, an RRC connection reconfiguration message, or the like.

Each aspect/embodiment described in the present disclosure may be applied to at least one of a system using LTE (Long Term Evolution), LTE-A (LTE-Advanced), SUPER 3G, IMT-Advanced, 4G (4th generation mobile communication system), 5G (5th generation mobile communication system), FRA (Future Radio Access), NR (new Radio), W-CDMA (registered trademark), GSM (registered trademark), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), and other appropriate systems, and a next generation system enhanced therefrom. Further, multiple systems may also be applied in combination (e.g., at least one of LTE and LTE-A combined with 5G, etc.).

The order of processing steps, sequences, flowcharts or the like of an aspect/embodiment described in the present specification may be changed as long as there is no contradiction. For example, in a method described in the present specification, elements of various steps are presented in an exemplary order. The order is not limited to the presented specific order.

The particular operations, that are supposed to be performed by the base station 10 in the present specification, may be performed by an upper node in some cases. In a network including one or more network nodes including the base station 10, it is apparent that various operations performed for communicating with the terminal 20 may be performed by the base station 10 and/or another network node other than the base station 10 (for example, but not limited to, MME or S-GW). According to the above, a case is described in which there is a single network node other than the base station 10. However, a combination of multiple other network nodes may be considered (e.g., MME and S-GW).

The information or signals described in this disclosure may be output from a higher layer (or lower layer) to a lower layer (or higher layer). The information or signals may be input or output through multiple network nodes.

The input or output information may be stored in a specific location (e.g., memory) or managed using management tables. The input or output information may be overwritten, updated, or added. The information that has been output may be deleted. The information that has been input may be transmitted to another apparatus.

A decision or a determination in an embodiment of the present invention may be realized by a value (0 or 1) represented by one bit, by a boolean value (true or false), or by comparison of numerical values (e.g., comparison with a predetermined value).

Software should be broadly interpreted to mean, whether referred to as software, firmware, middle-ware, microcode, hardware description language, or any other name, instructions, instruction sets, codes, code segments, program codes, programs, subprograms, software modules, applications, software applications, software packages, routines, subroutines, objects, executable files, executable threads, procedures, functions, and the like.

Further, software, instructions, information, and the like may be transmitted and received via a transmission medium. For example, in the case where software is transmitted from a website, server, or other remote source using at least one of wired line technologies (such as coaxial cable, fiber optic cable, twisted pair, digital subscriber line (DSL) and wireless technologies (infrared, microwave, etc.), at least one of these wired line technologies and wireless technologies is included within the definition of the transmission medium.

Information, a signal, or the like, described in the present specification may represented by using any one of various different technologies. For example, data, an instruction, a command, information, a signal, a bit, a symbol, a chip, or the like, described throughout the present application, may be represented by a voltage, an electric current, electromagnetic waves, magnetic fields, a magnetic particle, optical fields, a photon, or a combination thereof.

It should be noted that a term used in the present specification and/or a term required for understanding of the present specification may be replaced by a term having the same or similar meaning. For example, a channel and/or a symbol may be a signal (signaling). Further, a signal may be a message. Further, the component carrier (CC) may be referred to as a carrier frequency, cell, frequency carrier, or the like.

As used in the present disclosure, the terms "system" and "network" are used interchangeably.

Further, the information, parameters, and the like, described in the present disclosure may be expressed using absolute values, relative values from predetermined values, or they may be expressed using corresponding different information. For example, a radio resource may be what is indicated by an index.

The names used for the parameters described above are not used as limitations. Further, the mathematical equations using these parameters may differ from those explicitly disclosed in the present disclosure. Because the various channels (e.g., PUCCH, PDCCH) and information elements may be identified by any suitable names, the various names assigned to these various channels and information elements are not used as limitations.

In the present disclosure, the terms "BS: Base Station", "Radio Base Station", "Base Station", "Fixed Station", "NodeB", "eNodeB (eNB)", "gNodeB (gNB)", "Access Point", "Transmission Point", "Reception Point", "Transmission/Reception Point", "Cell", "Sector", "Cell Group", "Carrier", "Component Carrier", and the like, may be used interchangeably. The base station may be referred to as a macro-cell, a small cell, a femtocell, a picocell and the like.

The base station may accommodate (provide) one or more (e.g., three) cells. In the case where the base station accommodates a plurality of cells, the entire coverage area of the base station may be divided into a plurality of smaller areas, each smaller area may provide communication services by means of a base station subsystem (e.g., an indoor small base station or a remote Radio Head (RRH)). The term "cell" or "sector" refers to a part or all of the coverage area of at least one of the base station and base station subsystem that provides communication services at the coverage.

In the present disclosure, terms such as "mobile station (MS)!", "user terminal", "user equipment (UE)", "terminal", and the like, may be used interchangeably.

There is a case in which the mobile station may be referred to, by a person skilled in the art, as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other appropriate terms.

At least one of the base station and the mobile station may be referred to as a transmission apparatus, reception apparatus, communication apparatus, or the like. The at least one of the base station and the mobile station may be a device mounted on the mobile station, the mobile station itself, or the like. The mobile station may be a vehicle (e.g., a car, an airplane, etc.), an unmanned mobile body (e.g., a drone, an automated vehicle, etc.), or a robot (manned or unmanned). At least one of the base station and the mobile station may include an apparatus that does not necessarily move during communication operations. For example, at least one of the base station and the mobile station may be an IoT (Internet of Things) device such as a sensor.

Further, the base station in the present disclosure may be read as the user terminal. For example, each aspect/embodiment of the present disclosure may be applied to a configuration in which communications between the base station and the user terminal are replaced by communications between multiple terminals 20 (e.g., may be referred to as D2D (Device-to-Device), V2X (Vehicle-to-Everything), etc.). In this case, the function of the base station 10 described above may be provided by the terminal 20. Further, the phrases "up" and "down" may also be replaced by the phrases corresponding to terminal-to-terminal communication (e.g., "side"). For example, an uplink channel, an downlink channel, or the like, may be read as a sidelink channel.

Further, the user terminal in the present disclosure may be read as the base station. In this case, the function of the user terminal described above may be provided by the base station.

The term "determining" used in the present specification may include various actions or operations. The "determining" may include, for example, a case in which "judging", "calculating", "computing", "processing", "deriving", "investigating", "looking up, search, inquiry" (e.g., looking up a table, database, or other data structures), or "ascertaining" is deemed as "determining". Further, the "determining" may include a case in which "receiving" (e.g., receiving information), "transmitting" (e.g., transmitting information), "inputting", "outputting", or "accessing" (e.g., accessing data in a memory) is deemed as "determining". Further, the "determining" may include a case in which "resolving", "selecting", "choosing", "establishing", "comparing", or the like is deemed as "determining". In other words, the "determining" may include a case in which a certain action or operation is deemed as "determining". Further, "decision" may be read as "assuming," "expecting," or "considering," etc.

The term "connected" or "coupled" or any variation thereof means any direct or indirect connection or connection between two or more elements and may include the presence of one or more intermediate elements between the two elements "connected" or "coupled" with each other. The coupling or connection between the elements may be physical, logical, or a combination thereof. For example, "connection" may be read as "access". As used in the present disclosure, the two elements may be thought of as being "connected" or "coupled" to each other using at least one of the one or more wires, cables, and printed electrical connections and, as a number of non-limiting and non-inclusive examples, electromagnetic energy having wavelengths in the radio frequency region, the microwave region, and the light (both visible and invisible) region.

The reference signal may be abbreviated as RS or may be referred to as a pilot, depending on the applied standards.

The description "based on" used in the present specification does not mean "based on only" unless otherwise specifically noted. In other words, the phrase "base on" means both "based on only" and "based on at least".

Any reference to an element using terms such as "first" or "second" as used in the present disclosure does not generally limit the amount or the order of those elements. These terms may be used in the present disclosure as a convenient way to distinguish between two or more elements. Therefore, references to the first and second elements do not imply that only two elements may be employed or that the first element must in some way precede the second element.

"Means" included in the configuration of each of the above apparatuses may be replaced by "parts," "circuits," "devices," etc.

In the case where the terms "include", "including" and variations thereof are used in the present disclosure, these terms are intended to be comprehensive in the same way as the term "comprising". Further, the term "or" used in the present specification is not intended to be an "exclusive or".

A radio frame may include one or more frames in the time domain. Each of the one or more frames in the time domain may be referred to as a subframe. The subframe may further include one or more slots in the time domain. The subframe may be a fixed length of time (e.g., 1 ms) independent from the numerology.

The numerology may be a communication parameter that is applied to at least one of the transmission and reception of a signal or channel. The numerology may indicate at least one of, for example, SubCarrier Spacing (SCS), bandwidth, symbol length, cyclic prefix length, transmission time interval (TTI), number of symbols per TTI, radio frame configuration, specific filtering processing performed by the transceiver in the frequency domain, and specific windowing processing performed by the transceiver in the time domain.

The slot may include one or more symbols in the time domain, such as OFDM (Orthogonal Frequency Division Multiplexing) symbols, SC-FDMA (Single Carrier Frequency Division Multiple Access) symbols, and the like. The slot may be a time unit based on the numerology.

The slot may include a plurality of mini slots. Each mini slot may include one or more symbols in the time domain. Further, the mini slot may be referred to as a sub-slot. The mini slot may include fewer symbols than the slot. PDSCH (or PUSCH) transmitted in time units greater than a mini slot may be referred to as PDSCH (or PUSCH) mapping type A. PDSCH (or PUSCH) transmitted using a mini slot may be referred to as PDSCH (or PUSCH) mapping type B.

A radio frame, a subframe, a slot, a mini slot and a symbol all represent time units for transmitting signals. Different terms may be used for referring to a radio frame, a subframe, a slot, a mini slot and a symbol, respectively.

For example, one subframe may be referred to as a transmission time interval (TTI), multiple consecutive subframes may be referred to as a TTI, and one slot or one mini slot may be referred to as a TTI. In other words, at least one of the subframe and the TTI may be a subframe (1 ms) in an existing LTE, a period shorter than 1 ms (e.g., 1-13 symbols), or a period longer than 1 ms. It should be noted that the unit representing the TTI may be referred to as a slot, a mini slot, or the like, rather than a subframe.

The TTI refers to, for example, the minimum time unit for scheduling in wireless communications. For example, in an LTE system, a base station schedules each terminal 20 to allocate radio resources (such as frequency bandwidth, transmission power, etc. that can be used in each terminal 20) in TTI units. The definition of TTI is not limited to the above.

The TTI may be a transmission time unit, such as a channel-encoded data packet (transport block), code block, codeword, or the like, or may be a processing unit, such as scheduling or link adaptation. It should be noted that, when a TTI is provided, the time interval (e.g., the number of symbols) during which the transport block, code block, codeword, or the like, is actually mapped may be shorter than the TTI.

It should be noted that, when one slot or one mini slot is referred to as a TTI, one or more TTIs (i.e., one or more slots or one or more mini slots) may be the minimum time unit for scheduling. Further, the number of slots (the number of mini slots) constituting the minimum time unit of the scheduling may be controlled.

A TTI having a time length of 1 ms may be referred to as a normal TTI (a TTI in LTE Rel. 8-12), a long TTI, a normal subframe, a long subframe, a slot, and the like. A TTI that is shorter than the normal TTI may be referred to as a shortened TTI, a short TTI, a partial TTI (partial or fractional TTI), a shortened subframe, a short subframe, a mini slot, a subslot, a slot, or the like.

It should be noted that the long TTI (e.g., normal TTI, subframe, etc.) may be replaced with a TTI having a time length exceeding 1 ms, and the short TTI (e.g., shortened TTI, etc.) may be replaced with a TTI having a TTI length less than the TTI length of the long TTI and a TTI length greater than 1 ms.

A resource block (RB) is a time domain and frequency domain resource allocation unit and may include one or more consecutive subcarriers in the frequency domain. The number of subcarriers included in a RB may be the same, regardless of the numerology, and may be 12, for example. The number of subcarriers included in a RB may be determined on the basis of numerology.

Further, the time domain of a RB may include one or more symbols, which may be 1 slot, 1 mini slot, 1 subframe, or 1 TTI in length. One TTI, one subframe, etc., may each include one or more resource blocks.

It should be noted that one or more RBs may be referred to as physical resource blocks (PRBs, Physical RBs), subcarrier groups (SCGs), resource element groups (REGs), PRB pairs, RB pairs, and the like.

Further, a resource block may include one or more resource elements (RE). For example, 1 RE may be a radio resource area of one sub-carrier and one symbol.

The bandwidth part (BWP) (which may also be referred to as a partial bandwidth, etc.) may represent a subset of consecutive common RBs (common resource blocks) for a given numerology in a carrier. Here, a common RB may be identified by an index of RB relative to the common reference point of the carrier. A PRB may be defined in a BWP and may be numbered within the BWP.

BWP may include BWP for UL (UL BWP) and BWP for DL (DL BWP). For a terminal 20, one or more BWPs may be configured in one carrier.

At least one of the configured BWPs may be activated, and the terminal 20 may assume that the UE will not transmit and receive signals/channels outside the activated BWP. It should be noted that the terms "cell" and "carrier" in this disclosure may be replaced by "BWP."

Structures of a radio frame, a subframe, a slot, a mini slot, and a symbol described above are exemplary only. For example, the number of subframes included in a radio frame, the number of slots per subframe or radio frame, the number of mini slots included in a slot, the number of symbols and RBs included in a slot or mini slot, the number of subcarriers included in a RB, the number of symbols in a TTI, the symbol length, the cyclic prefix (CP) length, and the like, may changed in various ways.

In the present disclosure, where an article is added by translation, for example "a", "an", and "the", the disclosure may include that the noun following these articles is plural.

In this disclosure, the term "A and B are different" may mean "A and B are different from each other." It should be noted that the term "A and B are different" may mean "A and B are different from C." Terms such as "separated" or "combined" may be interpreted in the same way as the above-described "different".

An aspect/embodiment described in the present specification may be used independently, may be used in combination, or may be used by switching according to operations. Further, notification (transmission/reporting) of predetermined information (e.g., notification (transmission/reporting) of "X") is not limited to an explicit notification (transmission/reporting), and may be performed by an implicit notification (transmission/reporting) (e.g., by not performing notification (transmission/reporting) of the predetermined information).

Note that the transmission unit 210 and the reception unit 220 in the disclosure are examples of the communication unit.

As described above, the present invention has been described in detail. It is apparent to a person skilled in the art that the present invention is not limited to one or more embodiments of the present invention described in the present specification. Modifications, alternatives, replacements, etc., of the present invention may be possible without departing from the subject matter and the scope of the present invention defined by the descriptions of claims. Therefore, the descriptions of the present specification are for illustrative purposes only, and are not intended to be limitations to the present invention.

The present international patent application is based on and claims priority to Japanese patent application No. 2020-076211 filed on Apr. 22, 2020, the entire contents of which are hereby incorporated herein by reference.

DESCRIPTION OF THE REFERENCE NUMERALS

10 Base station
110 Transmission unit
120 Reception unit
130 Configuration unit
140 Control unit
20 Terminal
210 Transmission unit
220 Reception unit
230 Configuration unit
240 Control unit
1001 Processor
1002 Storage apparatus
1003 Auxiliary storage apparatus
1004 Communication apparatus
1005 Input apparatus
1006 Output device

The invention claimed is:

1. A terminal comprising:
a reception unit configured to receive information related to MCS (Modulation and coding scheme) applied to a terminal-to-terminal direct communication;
a control unit configured to determine a range of MCS indices that can be used in each of a plurality of MCS tables, based on a parameter included in the information, the range being enabled to vary among the plurality of MCS tables; and
a communication unit configured to perform the terminal-to-terminal direct communication using a modulation order associated with an MCS index within the range that is configured to an MCS table selected from among the plurality of MCS tables, wherein, in response to the information not indicating a range of MCS indices that can be used in a specific MCS table, the control unit enables all MCS indices of the specific MCS table to be used.

2. The terminal according to claim 1, wherein the control unit performs the terminal-to-terminal direct communication using a target code rate associated with the MCS index within the range.

3. The terminal according to claim 1, wherein the plurality of MCS tables include at least two tables among: a first MCS table that supports from QPSK to 64QAM; a second MCS table that supports from QPSK to 256QAM; and a third MCS table that supports QPSK to 64QAM, a spectral efficiency being lower than that of the first MCS table.

4. The terminal according to claim 2, wherein the plurality of MCS tables include at least two tables among: a first MCS table that supports from QPSK to 64QAM; a second MCS table that supports from QPSK to 256QAM; and a third MCS table that supports QPSK to 64QAM, a spectral efficiency being lower than that of the first MCS table.

5. A communication method of a terminal, comprising:
receiving information related to MCS (Modulation and coding scheme) applied to a terminal-to-terminal direct communication;
determining a range of MCS indices that can be used in each of a plurality of MCS tables, based on a parameter included in the information, the range being enabled to vary among the plurality of MCS tables;
performing the terminal-to-terminal direct communication using a modulation order associated with an MCS index within the range that is configured to an MCS table selected from among the plurality of MCS tables; and
in response to the information not indicating a range of MCS indices that can be used in a specific MCS table, enabling all MCS indices of the specific MCS table to be used.

6. A communication system comprising: a base station; and a terminal, wherein
the base station includes:
a transmission unit configured to transmit information related to MCS (Modulation and coding scheme) applied to a terminal-to-terminal direct communication to the terminal, and
the terminal includes:
a reception unit configured to receive the information from the base station;
a control unit configured to determine a range of MCS indices that can be used in each of a plurality of MCS tables, from a parameter included in the information, the range being enabled to vary among the plurality of MCS tables; and
a communication unit configured to perform the terminal-to-terminal direct communication using a modulation order associated with an MCS index within the range that is configured to an MCS table selected from among the plurality of MCS tables,
wherein, in response to the information not indicating a range of MCS indices that can be used in a specific MCS table, the control unit enables all MCS indices of the specific MCS table to be used.

* * * * *